US012695697B2

(12) United States Patent
Tamizkar

(10) Patent No.: US 12,695,697 B2
(45) Date of Patent: Jul. 28, 2026

(54) METHODS AND SWITCH DEVICES FOR SWITCHING DATA FRAMES IN A COMMUNICATIONS NETWORK

(71) Applicant: Telia Company AB, Solna (SE)

(72) Inventor: Babak Tamizkar, Stockholm (SE)

(73) Assignee: Telia Company, AB (SE)

( * ) Notice: Subject to any disclaimer, the term of this patent is extended or adjusted under 35 U.S.C. 154(b) by 142 days.

(21) Appl. No.: 18/883,818

(22) Filed: Sep. 12, 2024

(65) Prior Publication Data

US 2025/0088389 A1     Mar. 13, 2025

Related U.S. Application Data

(60) Provisional application No. 63/537,872, filed on Sep. 12, 2023.

(51) Int. Cl.
| | |
|---|---|
| *H04L 45/00* | (2022.01) |
| *H04L 12/46* | (2006.01) |
| *H04L 45/745* | (2022.01) |
| *H04L 49/00* | (2022.01) |
| *H04L 61/103* | (2022.01) |

(52) U.S. Cl.
CPC .......... *H04L 45/66* (2013.01); *H04L 12/4645* (2013.01); *H04L 45/745* (2013.01); *H04L 49/70* (2013.01); *H04L 61/103* (2013.01)

(58) Field of Classification Search
CPC ... H04L 45/66; H04L 12/4645; H04L 45/745; H04L 49/70; H04L 61/103; H04L 49/354; H04L 12/4641
See application file for complete search history.

(56) References Cited

U.S. PATENT DOCUMENTS

| | | | | | |
|---|---|---|---|---|---|
| 6,151,324 | A | * | 11/2000 | Belser | ................. H04L 12/4608 370/409 |
| 6,765,914 | B1 | * | 7/2004 | Jain | ....................... H04L 45/583 370/395.31 |
| 7,912,074 | B2 | * | 3/2011 | Cantwell | ............... H04J 3/1617 370/535 |

(Continued)

OTHER PUBLICATIONS

European Search Report, Dec. 23, 2024, Application No. 24199795. 6, European Patent Office, Munich Germany.

(Continued)

*Primary Examiner* — Oanh Duong
(74) *Attorney, Agent, or Firm* — Burr & Forman LLP; Nathaniel T. Quirk, Esq.

(57) ABSTRACT

A method may include receiving a data frame from a source host node that is connected to the source switch device, and modifying the data frame by replacing the source MAC address with a switch ID, a VLAN ID associated with a port of the source switch device, and a source IP address. The method may further include determining if there is a MAC address table in the source switch device. If the table is in the source switch device, the method may include including, in an entry of the MAC address table, the source IP address, the source MAC address, a port number indicating a port of the source switch device, and a VLAN ID associated with the port of the source switch device from which port the data frame is received. The method may further include forwarding or flooding the modified data frame to a switch device.

19 Claims, 7 Drawing Sheets

(56) References Cited

U.S. PATENT DOCUMENTS

| | | | |
|---|---|---|---|
| 8,724,638 B1 * | 5/2014 | Carrie | H04L 61/10 |
| | | | 370/409 |
| 8,830,997 B1 * | 9/2014 | Bishara | H04L 45/00 |
| | | | 726/13 |
| 9,282,061 B1 * | 3/2016 | Zoucha | H04L 49/30 |
| 9,860,168 B1 * | 1/2018 | Seshadri | H04L 69/22 |
| 9,866,409 B2 * | 1/2018 | Sigoure | H04L 12/4641 |
| 11,070,471 B1 | 7/2021 | Chang | |
| 2015/0016462 A1 * | 1/2015 | Zhou | H04L 45/66 |
| | | | 370/392 |
| 2015/0222543 A1 | 8/2015 | Song | |
| 2016/0337234 A1 * | 11/2016 | Duda | H04L 45/66 |

OTHER PUBLICATIONS

Scalable and Reliable Data Center Networks by Combining Source Routing and Automatic Labelling, Elisa Rojas, et al., Network 2022, MDPI.

* cited by examiner

Figure 2

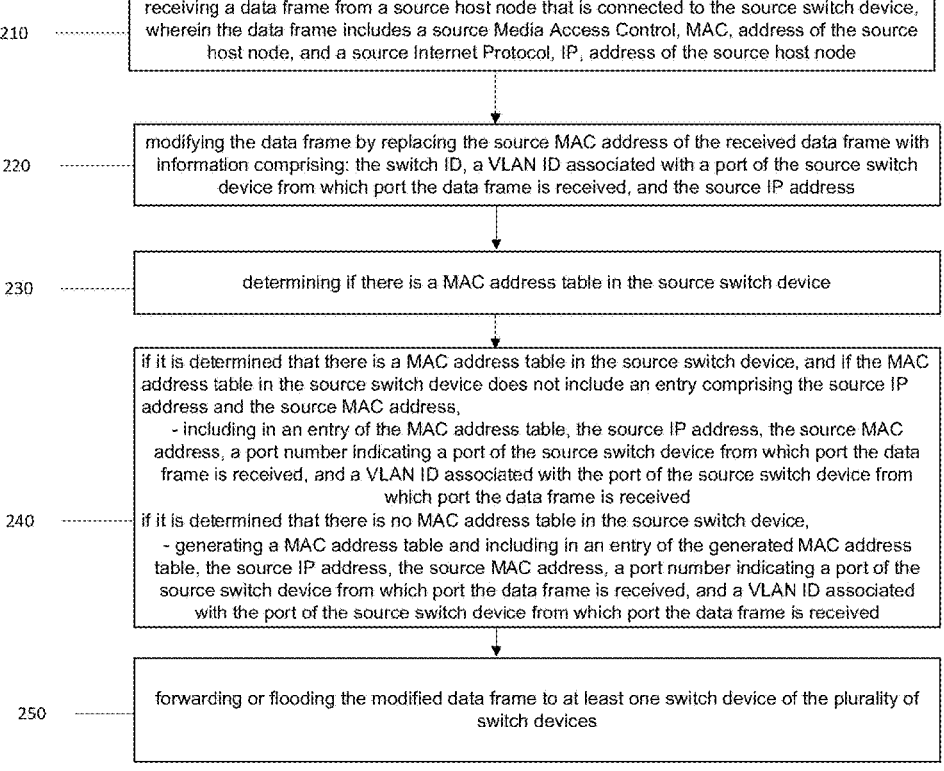

200

210 ········· receiving a data frame from a source host node that is connected to the source switch device, wherein the data frame includes a source Media Access Control, MAC, address of the source host node, and a source Internet Protocol, IP, address of the source host node 220 ········· modifying the data frame by replacing the source MAC address of the received data frame with information comprising: the switch ID, a VLAN ID associated with a port of the source switch device from which port the data frame is received, and the source IP address 230 ········· determining if there is a MAC address table in the source switch device 240 ········· if it is determined that there is a MAC address table in the source switch device, and if the MAC address table in the source switch device does not include an entry comprising the source IP address and the source MAC address,
     - including in an entry of the MAC address table, the source IP address, the source MAC address, a port number indicating a port of the source switch device from which port the data frame is received, and a VLAN ID associated with the port of the source switch device from which port the data frame is received
     if it is determined that there is no MAC address table in the source switch device,
     - generating a MAC address table and including in an entry of the generated MAC address table, the source IP address, the source MAC address, a port number indicating a port of the source switch device from which port the data frame is received, and a VLAN ID associated with the port of the source switch device from which port the data frame is received 250 ········· forwarding or flooding the modified data frame to at least one switch device of the plurality of switch devices

Figure 3:
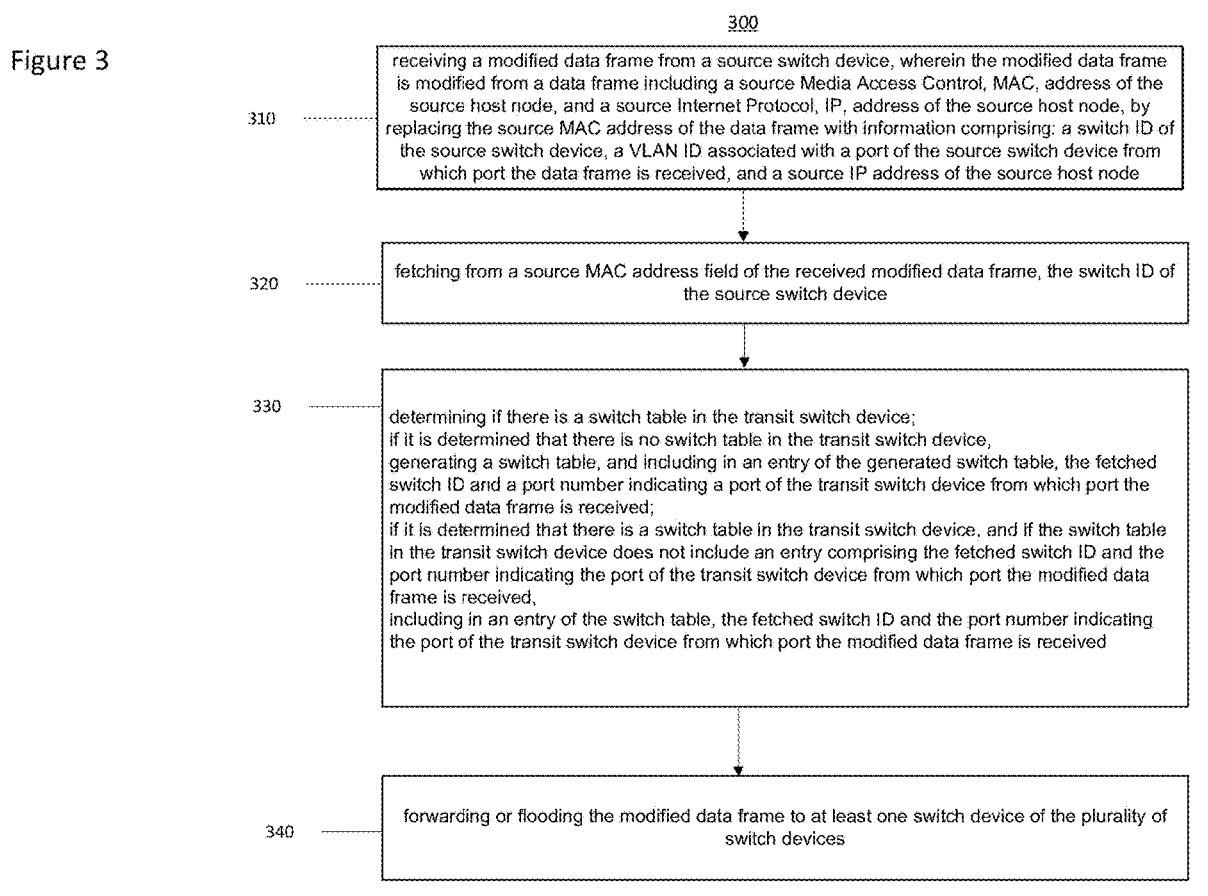

310 ........... receiving a modified data frame from a source switch device, wherein the modified data frame is modified from a data frame including a source Media Access Control, MAC, address of the source host node, and a source Internet Protocol, IP, address of the source host node, by replacing the source MAC address of the data frame with information comprising: a switch ID of the source switch device, a VLAN ID associated with a port of the source switch device from which port the data frame is received, and a source IP address of the source host node 320 ........... fetching from a source MAC address field of the received modified data frame, the switch ID of the source switch device 330 ........... determining if there is a switch table in the transit switch device;
if it is determined that there is no switch table in the transit switch device,
generating a switch table, and including in an entry of the generated switch table, the fetched switch ID and a port number indicating a port of the transit switch device from which port the modified data frame is received;
if it is determined that there is a switch table in the transit switch device, and if the switch table in the transit switch device does not include an entry comprising the fetched switch ID and the port number indicating the port of the transit switch device from which port the modified data frame is received,
including in an entry of the switch table, the fetched switch ID and the port number indicating the port of the transit switch device from which port the modified data frame is received 340 ........... forwarding or flooding the modified data frame to at least one switch device of the plurality of switch devices

Figure 4

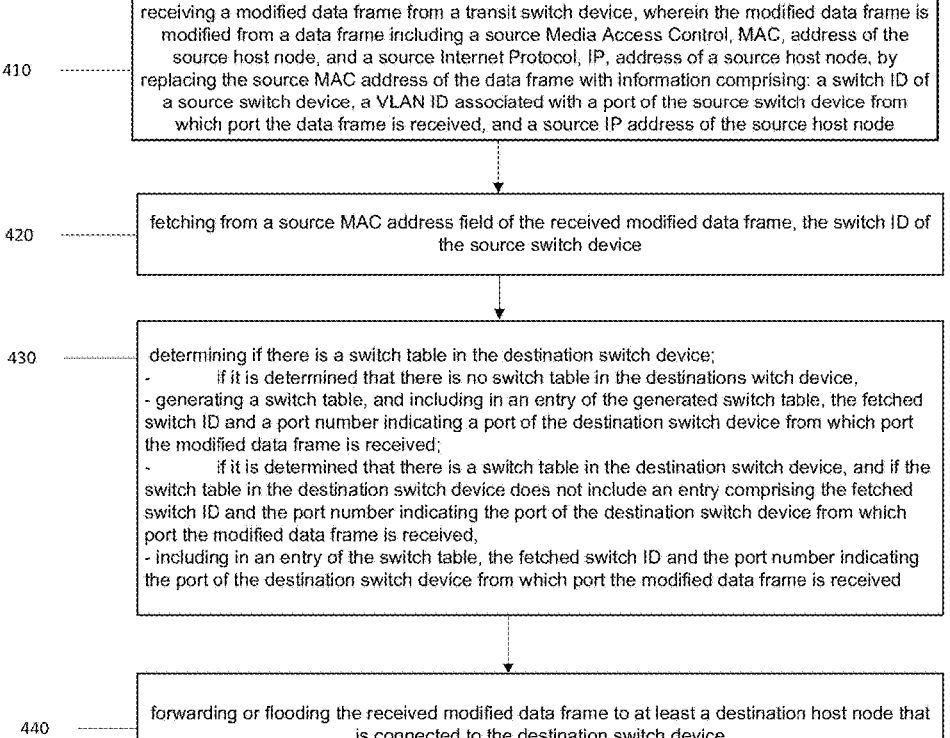

400

410 receiving a modified data frame from a transit switch device, wherein the modified data frame is modified from a data frame including a source Media Access Control, MAC, address of the source host node, and a source Internet Protocol, IP, address of a source host node, by replacing the source MAC address of the data frame with information comprising: a switch ID of a source switch device, a VLAN ID associated with a port of the source switch device from which port the data frame is received, and a source IP address of the source host node

420 fetching from a source MAC address field of the received modified data frame, the switch ID of the source switch device

430 determining if there is a switch table in the destination switch device;
-        if it is determined that there is no switch table in the destinations witch device,
- generating a switch table, and including in an entry of the generated switch table, the fetched switch ID and a port number indicating a port of the destination switch device from which port the modified data frame is received;
-        if it is determined that there is a switch table in the destination switch device, and if the switch table in the destination switch device does not include an entry comprising the fetched switch ID and the port number indicating the port of the destination switch device from which port the modified data frame is received,
- including in an entry of the switch table, the fetched switch ID and the port number indicating the port of the destination switch device from which port the modified data frame is received

440 forwarding or flooding the received modified data frame to at least a destination host node that is connected to the destination switch device

Figure 5

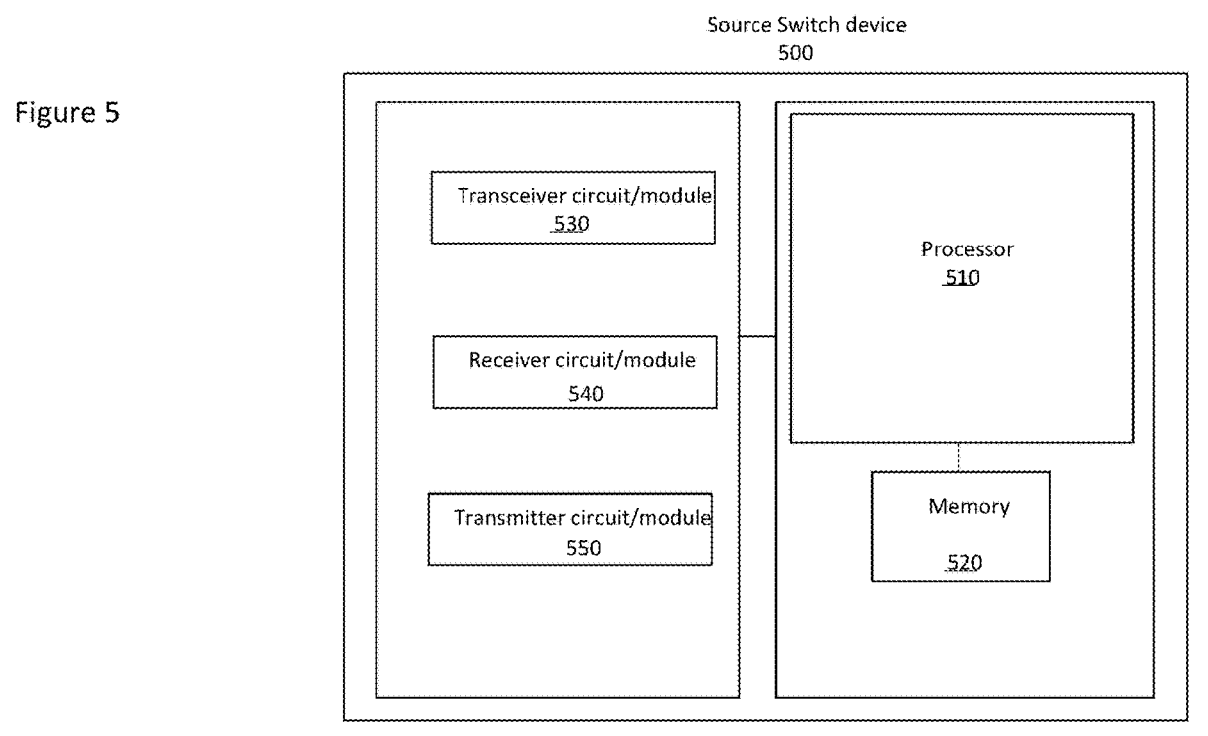

Source Switch device
500

Transceiver circuit/module
530

Receiver circuit/module
540

Transmitter circuit/module
550

Processor
510

Memory
520

METHODS AND SWITCH DEVICES FOR SWITCHING DATA FRAMES IN A COMMUNICATIONS NETWORK

CROSS-REFERENCE TO RELATED APPLICATION

The present application claims priority to U.S. Provisional Patent Application No. 63/537,872, filed on Sep. 12, 2023, the contents of which are hereby incorporated by reference in their entirety.

TECHNICAL FIELD

The present disclosure relates to the field of data communications, and in particular to methods and switch devices for switching data frames in a communications network.

BACKGROUND

Switching is an approach of delivering data frames across the network, which is described in Layer 2 (L2), i.e., Data Link Layer of an Open Systems Interconnection (OSI) model. Switching methods decide how a switch device receives, processes, and forwards or floods the data frames.

A data frame may variously be referred to as an ethernet frame, a frame, and the like. A data frame starts with a header, which includes the source and destination Medium or Media Access Control (MAC) addresses, data type, among other data. The middle part of the data frame is the actual data. A data frame ends with a field called Frame Check Sequence (FCS). The data/ethernet frame structure is defined in the IEEE 802.3 standard.

A network node may also be referred to as a network station such as a personal computer, a work station, a server, or an end user device.

A switch device may also be referred to as a switch, a router, and the like, having network interfaces for forwarding data frames originating from the network nodes. A switch device is capable of reading data frames. When a data frame enters at a port of the switch device, the switch device checks FCS field of the data frame and processes the data frame only when it is valid. All invalid data frames are automatically dropped. All valid data frames are processed and sent further to their destination MAC address.

A virtual LAN (VLAN) is a logical overlay network that groups together a subset of devices that share a physical LAN, isolating the traffic for each group. In this way, the number of broadcast domains is increased while their size is reduced. With VLANs, the users from gaining unwanted access to the resources can be controlled. The group of users that need high-level security may be put into their own VLAN so that users outside of that VLAN can't communicate with them. An extra layer of security may thus be created. The IEEE 802.1Q specification defines a standard virtual LAN (VLAN) tagging scheme (Q-tagging) where a "tag" field is added to ethernet frames to indicate in which VLAN they are supposed to go. This scheme allows an Ethernet port to participate in multiple VLANs. Data frames are constrained by VLAN boundaries (i.e., "tags") such that only switch devices whose ports are members of the same VLAN see those frames.

There is a need to further improve switching methods where VLAN technology is supported.

SUMMARY

It is therefore an object of embodiments herein to provide methods and devices for switching data frames that support VLAN technology.

According to a first aspect of embodiments herein, there is provided a method performed by a source switch device, for switching data frames in a communications network comprising a plurality of switch devices including the source switch device, wherein the source switch device is provided with a switch identifier, switch ID, and wherein each port of the source switch device is provided with a port number, and each port of the source switch device is associated with a virtual local area network identifier, VLAN ID. The method comprises receiving a data frame from a source host node that is connected to the source switch device, wherein the data frame includes a source Media Access Control, MAC, address of the source host node, and a source Internet Protocol, IP, address of the source host node. The method further comprises modifying the data frame by replacing the source MAC address of the received data frame with information comprising: the switch ID, a VLAN ID associated with a port of the source switch device from which port the data frame is received, and the source IP address. The method further comprises determining if there is a MAC address table in the source switch device. If it is determined that there is a MAC address table in the source switch device, and if the MAC address table in the source switch device does not include an entry comprising the source IP address and the source MAC address, the method comprises including in an entry of the MAC address table, the source IP address, the source MAC address, a port number indicating a port of the source switch device from which port the data frame is received, and a VLAN ID associated with the port of the source switch device from which port the data frame is received. If it is determined that there is no MAC address table in the source switch device, the method comprises generating a MAC address table and including in an entry of the generated MAC address table, the source IP address, the source MAC address, a port number indicating a port of the source switch device from which port the data frame is received, and a VLAN ID associated with the port of the source switch device from which port the data frame is received. The method further comprises forwarding or flooding the modified data frame to at least one switch device of the plurality of switch devices.

According to a second aspect of embodiments herein, there is provided a method performed by a transit switch device for switching data frames in a communications network comprising a plurality of switch devices including the transit switch device. The method comprises receiving a modified data frame from a source switch device, wherein the modified data frame is modified from a data frame including a source Media Access Control, MAC, address of the source host node, and a source Internet Protocol, IP, address of the source host node, by replacing the source MAC address of the data frame with information comprising: a switch ID of the source switch device, a VLAN ID associated with a port of the source switch device from which port the data frame is received, and a source IP address of the source host node. The method further comprises fetching from a source MAC address field of the received modified data frame, the switch ID of the source switch device. The method further comprises determining if there is a switch table in the transit switch device. If it is determined that there is no switch table in the transit switch device, the method comprises generating a switch table, and including in an entry of the generated switch table, the fetched switch ID and a port number indicating a port of the transit switch device from which port the modified data frame is received. If it is determined that there is a switch table in the transit switch device, and if the switch table in the transit switch device does not include an entry comprising the fetched switch ID and the port number indicating the port of the transit switch device from which port the modified data frame is received, the method comprises including in an entry of the switch table, the fetched switch ID and the port number indicating the port of the transit switch device from which port the modified data frame is received. The method further comprises forwarding or flooding the modified data frame to at least one switch device of the plurality of switch devices.

According to a third aspect of embodiments herein, there is provided a method performed by a destination switch device, for switching data frames in a communications network comprising a plurality of switch devices including the destination switch device. The method comprises receiving a modified data frame from a transit switch device, wherein the modified data frame is modified from a data frame including a source Media Access Control, MAC, address of the source host node, and a source Internet Protocol, IP, address of a source host node, by replacing the source MAC address of the data frame with information comprising: a switch ID of a source switch device, a VLAN ID associated with a port of the source switch device from which port the data frame is received, and a source IP address of the source host node. The method further comprises fetching from a source MAC address field of the received modified data frame, the switch ID. The method further comprises determining if there is a switch table in the destination switch device. If it is determined that there is no switch table in the destinations witch device, the method comprises generating a switch table, and including in an entry of the generated switch table, the fetched switch ID and a port number indicating a port of the destination switch device from which port the modified data frame is received. If it is determined that there is a switch table in the destination switch device, and if the switch table in the destination switch device does not include an entry comprising the fetched switch ID and the port number indicating the port of the destination switch device from which port the modified data frame is received, the method comprises including in an entry of the switch table, the fetched switch ID and the port number indicating the port of the destination switch device from which port the modified data frame is received. The method further comprises forwarding or flooding the received modified data frame to at least a destination host node that is connected to the destination switch device.

According to a fourth aspect herein, there is provided a source switch device for switching data frames in a communications network comprising a plurality of switch devices including the source switch device. The source switch device is provided with a switch identifier, switch ID, and wherein each port of the source switch device is provided with a port number, and each port of the source switch device is associated with a virtual local area network identifier, VLAN ID. The source switch device comprises a processor and a memory, the memory containing instructions executable by the processor, whereby the source switch device is operative to:

receive a data frame from a source host node that is connected to the source switch device, wherein the data frame includes a source Media Access Control, MAC, address of the source host node, and a source Internet Protocol, IP, address of the source host node;

modify the data frame by replacing the source MAC address of the received data frame with information comprising: the switch ID, a VLAN ID associated with a port of the source switch device from which port the data frame is received, and the source IP address;

determine if there is a MAC address table in the source switch device;

if it is determined that there is a MAC address table in the source switch device, and if the MAC address table in the source switch device does not include an entry comprising the source IP address and the source MAC address, include in an entry of the MAC address table, the source IP address, the source MAC address, a port number indicating a port of the source switch device from which port the data frame is received, and a VLAN ID associated with the port of the source switch device from which port the data frame is received;

if it is determined that there is no MAC address table in the source switch device, generate a MAC address table and include in an entry of the generated MAC address table, the source IP address, the source MAC address, a port number indicating a port of the source switch device from which port the data frame is received, and a VLAN ID associated with the port of the source switch device from which port the data frame is received; and forward or flood the modified data frame to at least one switch device of the plurality of switch devices.

According to a fifth aspect herein, there is provided a transit switch device for switching data frames in a communications network comprising a plurality of switch devices including the transit switch device. The transit switch device comprises a processor and a memory, the memory containing instructions executable by the processor, whereby the transit switch device is operative to:

receive a modified data frame from a source switch device, wherein the modified data frame is modified from a data frame including a source Media Access Control, MAC, address of the source host node, and a source Internet Protocol, IP, address of the source host node, by replacing the source MAC address of the data frame with information comprising: a switch ID of the source switch device, a VLAN ID associated with a port of the source switch device from which port the data frame is received, and a source IP address of the source host node;

fetch from a source MAC address field of the received modified data frame, the switch ID of the source switch device;

determine if there is a switch table in the transit switch device;

if it is determined that there is no switch table in the transit switch device, generate a switch table, and including in an entry of the generated switch table, the fetched switch ID and a port number indicating a port of the transit switch device from which port the modified data frame is received;

if it is determined that there is a switch table in the transit switch device, and if the switch table in the transit switch device does not include an entry comprising the fetched switch ID and the port number indicating the port of the transit switch device from which port the modified data frame is received, include in an entry of the switch table, the fetched switch ID and the port number indicating the port of the transit switch device from which port the modified data frame is received; and forward or flood the modified data frame to at least one switch device of the plurality of switch devices.

According to a sixth aspect herein, there is provided a destination switch device for switching data frames in a communications network comprising a plurality of switch devices including the destination switch device. The destination switch device comprises a processor and a memory, the memory containing instructions executable by the processor whereby the destination switch device is operative to:

receive a modified data frame from a transit switch device, wherein the modified data frame is modified from a data frame including a source Media Access Control, MAC, address of the source host node, and a source Internet Protocol, IP, address of a source host node, by replacing the source MAC address of the data frame with information comprising: a switch ID of a source switch device, a VLAN ID associated with a port of the source switch device from which port the data frame is received, and a source IP address of the source host node;

fetch from a source MAC address field of the received modified data frame, the switch ID;

determine if there is a switch table in the destination switch device;

if it is determined that there is no switch table in the destinations witch device, generate a switch table, and including in an entry of the generated switch table, the fetched switch ID and a port number indicating a port of the destination switch device from which port the modified data frame is received;

if it is determined that there is a switch table in the destination switch device, and if the switch table in the destination switch device does not include an entry comprising the fetched switch ID and the port number indicating the port of the destination switch device from which port the modified data frame is received, include in an entry of the switch table, the fetched switch ID and the port number indicating the port of the destination switch device from which port the modified data frame is received; and forward or flood the received modified data frame to at least a destination host node that is connected to the destination switch device.

The proposed methods have several advantages compared with other networking routing/switching protocols.

In standard switching technology, there is a need for an 802.1Q type header in a data frame structure to support VLAN ID and segmentation in the network. In this case, the original size of the data frame is required to be extended with 4 extra bytes. In some example embodiments, VLAN technology is supported and VLAN tag can be carried when a data frame has a standard size. It means no additional header like that used in 802.1Q is needed for carrying VLAN tag. In other words, VLAN and network segmentation are supported when the data frame has a standard size without an extra header, and no extension of the data frame is needed.

Using current standard methods with a 802.1Q type header, the maximum supported number of VLANs in a data frame is 4096. This limited number of supported VLANs can be a big challenge for network segmentation. If the methods proposed in the example embodiments described herein are used together with a 802.1Q type header, the total number of VLANs supported may be extended to more than thirty million VLANs, which is a significant improvement.

In standard switching technology, any switch device receiving a data frame from one of its ports is required to register the source MAC address field of the data frame in its MAC address table. But according to embodiments described herein, a switch device may register the source MAC address field of the data frame only when the data frame arrives at its access ports. An access port is a port of a switch device that is not directly connected to another switch device but instead connected to a device capable of sending a data frame to the switch device. In other words, MAC address learning may be performed only if a data frame comes from a port directly connected to a host node.

Additional advantages of the embodiments herein are provided in the detailed description of this disclosure.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

Examples of embodiments herein are described in more detail with reference to drawings in which:

FIG. 2 is a flowchart of a method performed by a source switch device for switching data frames, according to some embodiments;

FIG. 3 is a flowchart of a method performed by a transit switch device for switching data frames, according to some embodiments;

FIG. 4 is a flowchart of a method performed by a destination switch device for switching data frames, according to some embodiments;

FIG. 5 illustrates a block diagram of a source switch device, according to some embodiments;

DETAILED DESCRIPTION

Figure 1:
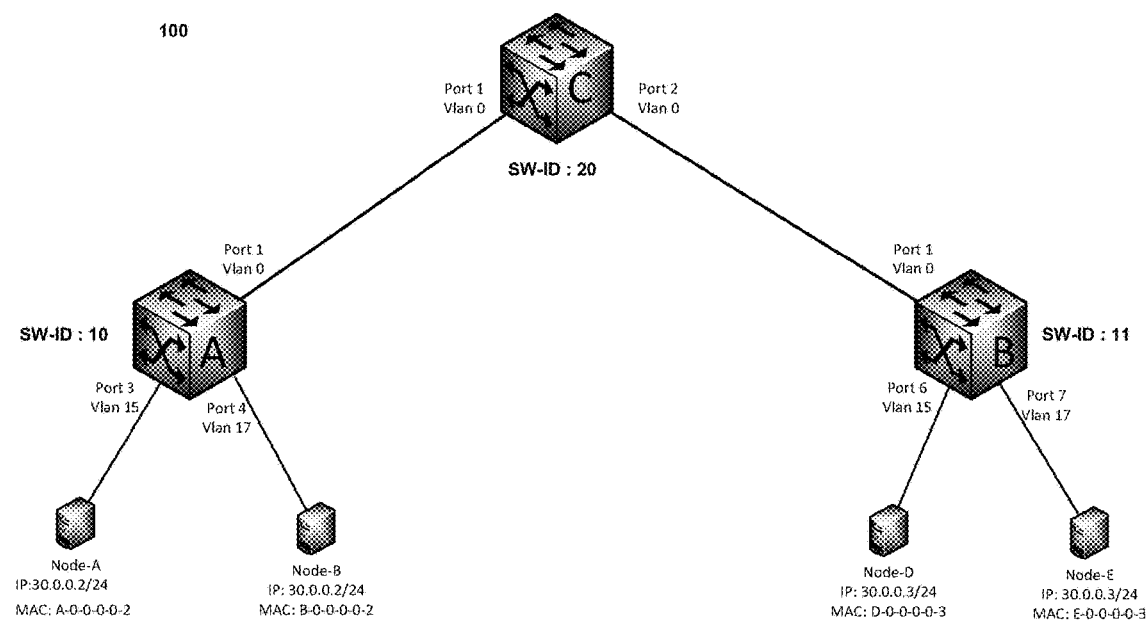
FIG. 1 schematically illustrates an example of a network topology at a Layer 2 domain, in accordance with some embodiments.

In the following, a detailed description of the exemplary embodiments is presented together with the drawings to enable easier understanding of the solutions described herein.

Hereinafter are described, according to embodiments herein, methods and switching devices for switching data frames. According to some example embodiments, the methods may be referred to as MAC-IP Switching (MIPS) methods. A switch device performing a MIPS method may be referred to as a MIPS switch device. A MAC address table according to some example embodiments may be referred to as a MAC-IP address table, or a MAC-IP table.

To facilitate understanding of the illustrated embodiments, some terminology used in the description of some example embodiments is explained below.

A source node may also be referred to as a source host node or a source host node device. It may mean, without limitation, a node that initiates a communication with another node.

A destination node may also be referred to as a destination host node or a destination host node device. It may mean, without limitation, a node that the source host node initiates communication with.

A source switch may also be referred to as a source switch device. It may mean, without limitation, a switch device that is directly connected to a source host node. Through some example embodiments, a switch device, without limitation, may simply be referred to as a switch.

A destination switch may also be referred to as a destination switch device. It may mean, without limitation, a switch device that is directly connected to a destination host node.

A transit switch may also be referred to as a transit switch device: It may mean, without limitation, a switch device that is not directly connected to a source or a destination host node. A Transit switch device may be between a source and destination switch devices. Data traffic from a source switch device to a destination switch device may pass through one or more transit switch devices.

Access ports may refer to ports that are directly connected to a node.

Arch ports may refer to any ports that connect two switch devices. An arch port may be interchangeable with a switch port, or a gateway port.

Typically, a Layer two switching uses the following terms:

Flooding: Forwarding a data frame by a switch device on all its ports except the port that the data frame arrives at.

Broadcast frame: A data frame with FF:FF:FF:FF:FF:FF (i.e., hexadecimal format) as its destination MAC address. This address does not point to any specific host node. If a switch device receives a broadcast frame, it floods the frame. A broadcast frame may also be referred to as a broadcast message.

Unicast frame: A data frame with a specific destination MAC address pointing to a specific node. A unicast frame may also be referred to as a unicast message.

Known Unicast frame: A unicast frame for which a switch device has an entry in its MAC address table for the unicast frame's destination MAC address.

Unknown Unicast frame: A unicast frame for which a switch device does not have an entry in its MAC address table for the unicast frame's destination MAC address.

A Standard Data Frame

Structure of a standard data frame may be seen below, where "ether type" is a two-byte entry that indicates the type of the data frame. For instance, a data frame with the code: 0806h is an ARP data frame, and a data frame with the code 8870h is an ethernet frame. A data frame may, without limitation, be referred to as a frame.

| Layer 2 address | | | |
| --- | --- | --- | --- |
| Destination MAC address | Source MAC address | Ether Type XXXX | Payload (Including L3 header) |
| "MAC of Destination Node" | "MAC of Source Node" | | |

A Broadcast Frame:

A data frame with FF:FF:FF:FF:FF:FF (hexadecimal format) as its destination MAC address, and an "ether type" field not pointing to an ARP frame may be referred to as a broadcast frame, or a broadcast message. The "ether type" entry is something other than "0806h" that is used for ARP data frame. The "FF:FF:FF:FF:FF:FF" address does not point to any specific host node. If a switch device receives a typical broadcast frame, it floods the frame.

An example of a broadcast frame can be seen below, where the "ether type" field indicates that the data frame is an ethernet frame.

| Layer 2 address | | | |
| --- | --- | --- | --- |
| Destination MAC address | Source MAC address | Ether Type Ethernet | Payload (Including L3 header) |
| FF:FF:FF:FF:FF:FF | "MAC of Source Node" | 88:70 | |

ARP Request Frame:

A frame with FF:FF:FF:FF:FF:FF (hexadecimal format) as its destination MAC address, and with its "ether Type" field pointing to an ARP frame may be referred to as an ARP request frame, or AEP request message. The "ether type" may be "0806h" indicating an ARP frame. The address of FF:FF:FF:FF:FF:FF does not point to any specific host node. If a switch device receives an ARP request frame, it floods the data frame. An example of an ARP request frame can be seen below.

| Layer 2 address | | | ARP Request header | | | |
| --- | --- | --- | --- | --- | --- | --- |
| Destination MAC address | Source MAC address | Ether Type ARP | Sender MAC address | Sender IP address | Target MAC address | Target IP address |
| FF:FF:FF:FF:FF:FF | "MAC of Source Node" | 08:06 | "MAC of Source Node" | "IP of sender node" | 00:00:00:00:00:00 | "IP of destination node" |

The ARP request frame is a data frame sent by a source host node to find out a MAC address of a destination host node with a known IP address.

As it is shown, the "sender MAC address" entry of the ARP request frame is a MAC address of the source host node. The "target MAC address" field has the value "0", because the MAC address of the destination node is unknown to the source host node.

Typical Unicast Frame:

A data frame with a specific destination MAC address pointing to a particular node and with its "ether Type" field not pointing to an ARP data frame may be referred to as a unicast frame, or a unicast message. In other words, the "ether type" of the data frame is different from "0806h".

| Layer 2 address | | | |
|---|---|---|---|
| Destination MAC address | Source MAC address | Ether Type Ethernet | Payload (Including L3 header) |
| "MAC of Destination Node" | "MAC of Source Node" | 88:70 | |

Typical ARP Reply Frame:

A data frame with a specific destination MAC address pointing to a particular node, and with its "ether Type" field pointing to an ARP frame may be referred to as an ARP reply frame, or an ARP reply message. An ARP reply frame is different from a unicast frame by its "ether type", with the value "0806h".

| | | | | ARP Reply header | | | |
|---|---|---|---|---|---|---|---|
| Layer 2 address | | Ether | | | Sender | | |
| Destination MAC address | Source MAC address | Type ARP | Sender MAC address | IP address | Target MAC address | Target IP address |
| "MAC of Destination Node" | "MAC of Source Node" | 08:06 | "MAC of Source Node" | "IP of sender node" | "MAC of Destination Node" | "IP of destination node" |

It is shown that in an ARP reply frame, both the "sender" and "target" MAC address fields are non-broadcast MAC addresses. The ARP reply frame is a data frame as a response from a destination host node receiving an ARP request frame. The destination host node to the ARP request frame sends its MAC address to the requester (i.e., a source host node that sent the ARP request frame).

When a node that has received an ARP request sends a APR reply, the node puts its MAC address inside the "sender MAC address" field. The "target MAC address" field will have the same value as that of the "sender MAC address" field of the previously received ARP request frame.

Data Frame with VLAN Tag (IEEE 802.1Q):

IEEE 802.1Q, often referred to as Dot1q, is a network standard that supports virtual local area networking (VLANs) on an IEEE 802.3 Ethernet network. The standard defines a system of VLAN tagging for Ethernet frames and the accompanying procedures to be used by bridges and switches in handling such frames.

Based on IEEE 802.1Q, VLAN-aware portions of a network (i.e., IEEE 802.1Q compliant network) may include VLAN tags. When a data frame enters a VLAN-aware portion of the network, a VLAN tag may be added to represent the VLAN membership. Each data frame may be associated with one VLAN.

802.1Q adds a 32-bit field as "802.1Q Header" between the source MAC address and the "EtherType" fields of the original data frame. The "802.1Q header" may include a Tag protocol identifier (TPID) that is a 16-bit field. The "802.1Q header" may also include VLAN identifier (VID) that is a 12-bit field. Under 802.1Q, the maximum frame size is extended from 1,518 bytes to 1,522 bytes. A frame format for a data frame with VLAN tag (IEEE 802.1Q) is shown below.

| Layer 2 address | | | | | | L3 address | | | |
|---|---|---|---|---|---|---|---|---|---|
| Destination | Source | 802.1Q Header | | | | Source | | | |
| MAC address | MAC address | TPID | other | VLAN ID | Ether Type | IP address | Destination IP address | Payload | CRC/FCS |
| 6 - Bytes | 6 - Bytes | 16-Bits | 4-bits | 12-Bits | 2-Bytes | 4-Bytes | 4-Bytes | | 4-Bytes |

Tag Protocol Identifier (TPID):

TPID is a 16-bit field that is set to a value of 0x8100 to identify the data frame as an IEEE 802.1Q-tagged data frame. This field is located at the same position as the "EtherType" field in untagged frames and is thus used to distinguish the IEEE 802.1Q-tagged frame from untagged frames.

VLAN Identifier (VID):

VID is a 12-bit field specifying the VLAN to which the data frame belongs. The values of 0 and 4095 (0x000 and 0xFFF in hexadecimal) are reserved. All other values between 0 and 4095 may be used as VLAN identifiers, allowing up to 4,094 VLANs.

Although many traditional switch devices work in layer 2 (L2), quite a lot of switch devices these days work in layer 3 (L3) as well. Layer 2 is also known as the data link layer with Ethernet as a most common protocol, where devices in an ethernet network are identified by a MAC (media access control) address. MAC address is generally hardcoded to a particular device and doesn't normally change. Layer 3 is the network layer and its protocol is the Internet Protocol (IP). Devices in an IP network are identified by an IP address, which can be dynamically assigned and may change over time. A L3 switch device can read the data frame's source and destination IP address.

In some embodiments as described below in details, if a data frame is an ARP request or ARP reply, only the source and destination switch devices need to have access to the L3 part of the data frame. For a unicast data frame, even the source and destination switch devices only look at the L2 part of the data frame. For all types of data frames, transit switches may only need to look at the L2 part of the data frame.

Optionally, each switch device needs to have a unique switch ID in the network topology. This switch ID may be assigned automatically by a protocol that runs between switch devices, or pre-configured or predetermined in the network, or configured manually by a network administrator. Optionally, each port of a switch device should be defined if it is an access port or an arch port.

Optionally, each port (included both "arch port" and "access port") needs to be assigned to a specific VLAN number.

Optionally, a port that is assigned to VLAN 0 (i.e., a port that is associated with VLAN 0) means this port can transfer or forward data traffic belong to all VLANs. The option of a port that is assigned to VLAN 0 may be used for an arch port to make it possible for the port to transfer traffic for all VLANs. A port associated with a VLAN number may give more control over data traffic.

To illustrate how the proposed methods work, it is assumed that there is a fresh network without MAC address tables as proposed according to some embodiments. As a first data frame, an ARP request may be sent in the network topology.

1) A First Frame: An ARP Request a) A source host node, Node-A, generates and sends out an ARP request frame to find out the MAC address of a destination host node Node-D.

b) The first directly connected switch device SW-A receives this ARP request frame. Switch device SW-A may be referred to as a source switch device for this ARP request frame. The ARP request frame may include a source Media Access Control (MAC) address of the source host node, and a source Internet Protocol, (IP) address of the source host node.

c) As it is a broadcast frame, the source switch device SW-A may look at both the L2 & L3 parts of the data frame. Optionally, it determines if there is a MAC address table in the source switch device. If it is determined that there is a MAC address table in the source switch device, and if the MAC address table in the source switch device does not include an entry comprising the source IP address and the source MAC address, the switch device SW-A may include in an entry of the MAC address table, the source IP address, the source MAC address, a port number indicating a port of the source switch device from which port the data frame is received, and a VLAN ID associated with the port of the source switch device from which port the data frame is received. If it is determined that there is no MAC address table in the source switch device, the source switch device SW-A may generate a MAC address table and include in an entry of the generated MAC address table, the source IP address, the source MAC address, a port number indicating a port of the source switch device from which port the data frame is received, and a VLAN ID associated with the port of the source switch device from which port the data frame is received. The port from which the data frame is received at a switch device may be referred to as an ingress port.

This MAC address table with an additional IP address field may be referred to as a "MAC-IP Address Table", which includes information relating to L3 part of the data frame. In accordance with some example embodiments, the original MAC address table associated with a switch device may need to be modified.

d) The source switch device may replace the source and sender MAC address field of the data frame with a combination of the source IP address of the data frame, the VLAN ID of the ingress port, and the switch ID of the source switch device. VLAN ID may be referred to as VLAN number. The original ARP request frame has been modified when the source and sender MAC address field of the original ARP request frame have been modified.

This procedure of replacing the original source MAC address of a data frame may be referred to as "MIPS ARP Replacement."

e) Except for the ingress port, the source switch device may flood the data frame on all ports with a common VLAN ID as that of the ingress port, or on ports with VLAN ID 0. This type of flooding may be referred to as "MIPS Flooding."

As it is shown, the data frame may carry a VLAN ID without the need for an extended 802.1Q header.

f) The next switch device, SW-C, receives the modified ARP request frame.

Because this frame arrives at an arch port, there is no MAC address learning, and this switch device may be either a transit or a destination switch device. In this case, the switch device SW-C may need to update its switch ID Table. The switch device SW-C may fetch from a source MAC address field of the received modified ARP request frame, the switch ID of the source switch device. The switch device SW-C may determine if there is a switch table in the transit switch device. If it is determined that there is no switch table in the transit switch device, the switch-device SW-C may generate a switch table, and include in an entry of the generated switch table, the fetched switch ID and a port number indicating a port of the switch device SW-C from which port the modified data frame is received. If it is determined that there is a switch table in the switch device SW-C, and if the switch table in the switch device SW-C does not include an entry comprising the fetched switch ID and the port number indicating the port of the switch device from which port the modified ARP request is received, the switch device SW-C may include in an entry of the switch table, the fetched switch ID and the port number indicating the port of the switch device SW-C from which port the modified ARP request is received. This procedure of generating and updating the switch ID table may be referred to as "MIPS SW-ID Registration." The port mapping to/associated with a switch ID inside the switch table (i.e., SW-Table) may be referred to as a "Gateway port". Because the modified ARP request frame arrives from an arch port, the switch device may not update its MAC address table.

g) The transit switch device, SW-C, floods the modified ARP request frame based on the "MIPS Flooding" procedure as discussed above, that is, to flood the modified ARP request frame on all ports with a common VLAN ID as that of the ingress port, or on ports with VLAN ID 0.

As it is shown, a transit switch device may only look at the L2 part of the data frame to route the data frame. There may not be any MAC address learning on a transit switch device.

h) The next switch device, SW-B, receives the modified ARP request frame. Because this data frame arrives from an arch port, there may not be any MAC address learning, and this switch device is either a transit or a destination switch device. The switch device SW-B may run the "MIPS SW-ID Registration" procedure in this case, where a switch table is generated or updated.

i) As this is a broadcast frame, the switch device SW-B may flood the data frame based on the "MIPS Flooding" procedure as described above.

j) Among all nodes that receive this broadcast frame (i.e., the modified ARP request frame), a destination host node Node-D may see its IP address as the destination IP address and accept the ARP request frame.

Optionally, the switching of a broadcast frame that is an ARP request sent from a source host node and arriving at a destination host node is completed.

2) A Second Frame: An ARP Reply

The procedure of sending an ARP reply from a node to respond to the ARP request sent by another node is very similar to that of transferring an ARP request. The main difference is that switch devices don't flood the data frame this time because the ARP reply is a unicast response.

Additionally, the destination switch device for the ARP reply may need to replace the modified destination MAC address field of the data frame with an original MAC address representing an original MAC address of a destination host before forwarding the data frame to the destination host node, Node-A.

a) A source host node, Node-D, generates and sends out an ARP reply to a destination node Node-A.

b) The first directly connected switch device SW-B receives this ARP reply frame, which may be considered as a unicast response.

c) As this is an ARP reply frame, the source switch device SW-B may look at L3 part of the data frame in addition to the L2 part of the data frame.

Because the data frame arrives from an access port, the switch device SW-B may be considered as a source switch device. If it is determined that there is a MAC address table in the switch device SW-B, and if the MAC address table in the switch device SW-B does not include an entry comprising the source IP address and the source MAC address, the switch device SW-B may include in an entry of the MAC address table, the source IP address, the source MAC address, a port number indicating a port of the switch device SW-B from which port the data frame is received, and a VLAN ID associated with the port of the switch device SW-B from which port the data frame is received.

d) The switch device SW-B may run the "MIPS ARP Replacement" procedure as described above.

Since the ARP reply is not a broadcast frame, to forward the ARP reply, first, SW-B may look at the destination MAC address field of the data frame. It may fetch the switch ID (i.e., SW-ID) from the destination MAC address field of the data frame. SW-B may then look up this switch ID in its switch table (i.e., SW-ID Table) to determine a gateway port for this SW-ID. SW-B may then forward the data frame to the next switch device. This procedure of forwarding a data frame may be referred to as "MIPS Next Switch Forwarding."

e) The next switch device, SW-C, receives the data frame. Because this data frame arrives from an arch port, this switch device is either a transit or a destination switch device and there may not be any MAC address learning. In this case, the switch device SW-C may need to run the "MIPS SW-ID Registration" procedure as described above.

f) Because the switch-ID of the destination MAC address field of the arrived data frame differs from the SW-C's own switch ID, SW-C may need to forward the data frame based on the "MIPS Next Switch Forwarding" procedure as described above.

As it is shown, for an ARP reply message, a transit switch device may only look at the L2 part of the data frame to route the data frame. Optionally, no MAC address learning is needed.

g) The next switch device, SW-A, receives the data frame. Because this data frame arrives from an arch port, this switch is either a transit or a destination switch, and there may not be any MAC address learning. The switch device SW-A may run the "MIPS SW-ID Registration" procedure as described above.

h) Because the switch ID of the destination MAC address field of the arrived data frame is the same as the SW-A's own switch ID, SW-A is a destination switch device. Therefore, in this case, SW-A may need to replace the modified destination and target MAC address field of the ARP reply frame with the original MAC address of the destination node.

To do so, SW-A may fetch the source IP address from the modified destination MAC address field of the data frame. Then SW-A may look up this source IP address in its MAC-IP address table to determine what MAC address is mapped to the source IP address. The MAC address that is mapped to the source IP address in the MAC-IP address table may be considered as the original MAC address of the destination host node Node-A.

As the next step, SW-A may replace the modified destination and target MAC address field of the arrived data frame with the original MAC address of the destination node.

This procedure of replacement of the destination MAC address may be referred to as "MIPS ARP Reversing."

i) So far, SW-A knows the original MAC address of the destination node, Node-A. But it also needs to know where to forward the data frame. To do so, SW-A may look up that original MAC address in its MAC-IP address table to see what port is mapped to that MAC address.

When SW-A knows the port that Node-A is connected to, SW-A may forward the data frame through that port.

This procedure of finding the destination host node's port and forwarding the data frame to the destination host node through the port may be referred to as "MIPS Destination Node Forwarding."

j) Node-A receives this ARP reply frame as it sees its own MAC address inside the destination MAC address field of the data frame.

The switching for an ARP reply frame from a source host node to a destination host node is thus completed.

Transit switch devices may just look at the L2 part of the data frame for forward the data frame.

It may not be necessary for MAC address learning in the transit and destination switch devices when a data frame comes from an arch port.

Now let's look at a third frame that is unicast frame with data.

3) A Third Frame: A Unicast Data Frame

Assume the communication between Node-A and Node-D continues, as Node-A knows the MAC address of Node-D, it may want to send a data frame to Node-D. This data frame is a unicast frame with the source MAC address of Node-A and the destination MAC address of Node-D.

a) Node-A generates a unicast data frame and sends it out.

b) The directly connected switch device, SW-A, receives this unicast data frame. Because this is a unicast data frame and not an ARP Reply, SW-A may only look at the L2 part of the data frame.

SW-A may not need to update its MAC-IP address table because they were already updated when Node-A sent the ARP request.

c) As the next step, SW-A may replace the source MAC address field of the data frame with a modified one. This process is very similar to the "MIPS ARP Replacement" procedure described above, except SW-A may only need to replace the source MAC address because for a unicast data frame there is no sender MAC address field.

This procedure of replacement of the source MAC address may be referred to as "MIPS Unicast Replacement".

d) The next step is forward the modified unicast data frame toward the destination host node. SW-A may run the "MIPS Next Switch Forwarding" procedure and send out the data frame to the next switch.

e) The next switch device, SW-C, receives the modified unicast data frame. SW-C may not need to run the "MIPS SW-ID Registration" because there is already an entry in its switch table comprising the switch ID of the source MAC address field of the received modified data frame and the port number indicating the port of the switch device SW-C from which port the modified data frame is received.

f) As this is a unicast data frame, SW-C may run the "MIPS Next Switch Forwarding" procedure and forwards the data frame toward the next switch device.

g) The next switch device, SW-B, receives the data frame, i.e., the modified unicast data frame. SW-C may not need to run the "MIPS SW-ID Registration", because there is already an entry in its switch table comprising the switch ID of the source MAC address field of the received modified data frame and the port number indicating the port of the switch device SW-B from which port the modified data frame is received.

h) Because the switch ID inside the destination MAC address field of the arrived data frame is the same as SW-B's own switch ID, SW-B is a destination switch device. Therefore, in this case, SW-B may need to replace the modified destination MAC address field of the data frame with the original MAC address of the destination host node based on its MAC (i.e., MAC-IP) address table. This process is similar to that of "MIPS ARP Reversing," except SW-B may need to replace only the destination MAC address and not the target MAC address, since this is a unicast data frame and not an ARP Reply.

This replacement of the source MAC address may be referred to as "MIPS Unicast Reversing."

SW-B may forward the unicast frame to the destination host node, Node-D, based on "MIPS Destination Node Forwarding".

k) Node-D may receive this unicast data frame as it sees its own MAC address inside the destination MAC address field of the data frame.

As it is shown above, for a unicast data frame, none of the source, transit, and destination switch devices may need to look at the L3 part of the data frame anymore. The data frame may be transferred from a source host node to a destination host node by looking at only the L2 part of the data frame.

FIG. 1 schematically illustrates an example of a communications network 100 at a Layer 2 domain. A Layer 2 domain is a boundary of connected switch devices with no router-to-router traffic between them. At a Layer 2 domain, nodes communicate with each other only through switch devices, so no traffic between them passes through a router. The communications network 100 may be a wired or wireless communication network such as an LTE, 4G, LTE-A (or LTE-Advanced), 5G, WiMAX, WiFi, WCDMA, GSM network, any 3GPP cellular network, or any cellular network or system.

It is shown in FIG. 1 several connected switch devices A, B and C. A switch device may be connected to any type of network device, such as a physical server, a virtual server that hosts one or more Virtual machines (VM), any devices with a standard MAC address (e.g., a printer), and the like. In FIG. 1, switch device A is directly connected to Node-A with MAC address: A-0-0-0-0-2, IP address 30.0.0.2. Switch device A is also directly connected to Node-B with MAC address B-0-0-0-0-2, IP address 30.0.0.2. Both Node-A and Node-B may be bare-metal/physical servers. Switch device A is further directly connected to switch device C. Switch device B is directly connected to Node-C with IP address 40.0.0.2 and MAC address C-0-0-0-0-2. Switch device B is further directly connected to Node-D with IP address 30.0.0.3 and MAC address D-0-0-0-0-3. Switch device B is further directly connected to Node-E with IP address 30.0.0.3 and MAC address E-0-0-0-0-3.

To have a better understanding, some terms are explained below together with FIG. 1. A source host node may refer to a node that initiates a communication with another node. A destination host node may refer to a node that the source host node intends to communicate with. A source switch device may refer to a switch device that receives a data frame from a source host node. A destination switch device may refer to a switch device that sends a data frame to a destination host node. A transit switch device may refer to a switch device that is not directly connected to a source or destination host node. Instead, a transit switch device may be between a source and a destination switch device. Assume there is a data frame that is sent from Node-A to Node-Z, which passes through switch devices A, C and B, Node-A may be referred to as a source host node, and Node-D may be referred to as a destination host node. Switch device A may be referred to as a source switch device since it receives the data frame from the source host node Node-A. Switch device B may be referred to as a destination host node since it forwards the data frame further to a destination host node Node-D. Switch device C may be referred to as a transit switch devices since it is not directly connected to either a source or a destination host node.

Every switch device may be assigned or pre-configured a switch ID. For switch devices A, C and B, they are assigned to or pre-configured with switch ID 10, 20 and 11 (as shown in FIG. 1). Switch devices A and B with switch ID 10 and 11 are switch devices that are directly connected to a source or a destination host node. They may therefore be referred to as access switches or source/destination switch device. It is to be noticed that FIG. 1 is only for illustration purpose. In some networks, the source and the destination host node may be connected to the same switch device. In that case, the source and destination switch device are the same switch device.

Switch device C is a core/aggregation switch that is not directly connected to a node. Switch device C is placed between access switches (i.e., source or destination switch device) to facilitate transferring data frames between a source and a destination host node. In some networks, there may be a three-layer structure for switching, that is, core layer, aggregation layer and access layer. In some example embodiments, core and aggregation layers may be treated as one layer. Core and aggregation switches may both be referred to as transit switch devices. There may also be networks where a node is directly connected to a core/aggregation switch.

In FIG. 1, each switch device has a number of ports. These ports may be defined into two categories according to methods disclosed, in accordance with some example embodiments: switch port/arch port and access port. Switch port or arch port may refer to a port of a switch device where the port is directly connected to another switch device. As an example, for switch device A with switch ID 10, port 1 may be referred to as a switch port/arch port since the port is directly connected to switch device C. Access Port may refer to a port of a switch device that is not directly connected to another MAC-P switch device but connected to a device capable of sending a standard data frame to switch devices. The standard data frame may comprise a standard source MAC address and a standard destination MAC address. As an example, For switch device A with switch ID 10, ports 3 and 4 are access ports. For switch device B with switch ID 11, ports 5, 6, and 7 are access ports. Any port other than a switch port/arch port may be considered as an access port.

Each switch device may have a unique switch identifier (i.e., switch ID) in the network topology. This ID may be assigned automatically, such as by a protocol that runs between switch devices. The ID may be a pre-determined or pre-configured value, or set manually by a network administrator.

It can be seen from FIG. 1 that switch device A (SW-A) has a switch ID 10, switch device B (SW-B) has a switch ID 11, and switch device C (SW-C) has a switch ID 20.

Each port may be assigned with a VLAN number and belong to a VLAN. As it is shown in FIG. 1, SW-A has three ports in total, with port 1 as a switch port having VLAN number 0, and with ports 3, 4 as access ports having VLAN numbers 15, 17 respectively. SW-B has four ports in total, with port 1 as a switch port having VLAN number 0, and with ports 5, 6, 7 as access ports having VLAN numbers 15, 15, 17 respectively. SW-C has two ports in total, with ports 1, 2 as switch ports having VLAN numbers 0, 0 respectively. Take SW-A as an example, for port 3 that is an access port having VLAN number 15 and being connected to Node-A, it means that Node-A may only receive the traffic belonging to VLAN 15. For port 1 that is a switch port having VLAN number 0, all traffic belong to all VLANs may pass through this port. For port 4 assigned with VLAN number 17, it may indicate that Node-B connected to port 4 receives only the traffic belonging to VLAN 17. Node-A and Node-B may not communicate with each other as they are in different VLANs. Two nodes may only communicate if they are in the same VLAN, or at least one of the nodes has VLAN number 0. Take SW-B as another example, port 7 is assigned with or associated with VLAN number 17. It may mean that Node-E connected to port 7, can only receive the traffic belonging to VLAN 17. Since Node-E and Node-B are both in the same VLAN 17, they may communicate with each other.

The proposed methods with respect to different kinds of data frames are illustrated below by detailed examples.

1) A First Example: An ARP Request

Assume a first data frame is an ARP request.

a) A source host node, Node-A, generates and sends out an ARP request to find out the MAC address of a destination host node Node-D.

ARP Request sent out by Node-A is illustrated as follows:

| Layer 2 address | | ARP (request) | | | |
| --- | --- | --- | --- | --- | --- |
| Destination MAC address | Source MAC address | Sender MAC address | Sender IP address | Target MAC address | Target IP address |
| "FF" | A-0-0-0-0-2 | A-0-0-0-0-2 | 30.0.0.2 | 00 | 30.0.0.3 |

As explained above, the MAC address may consist of 6 bytes in binary format. For simplicity, the MAC address is shown in the hexadecimal numeral format, and each byte is divided from others with "-". The MAC address "FF" may mean that this is an address "255-255-255-255-255-255". If a data frame including a destination MAC address "FF" is received at a switch device, the switch device knows the destination MAC address is a broadcast address. In this case, the switch device floods the data frame.

b) The first directly connected switch device, SW-A, receives this ARP request frame. This switch device directly connected with a node for forwarding or flooding a data frame may be referred to as a source switch device.

c) The source switch device SW-A may look at both the L2 and L3 parts of the data frame. It determines if there is a MAC address table in the source switch device SW-A. If it is determined that there is a MAC address table in the source switch device, and if the MAC address table in the source switch device does not include an entry comprising the source IP address and the source MAC address, the source switch device may include in an entry of the MAC address table, the source IP address, the source MAC address, a port number indicating a port of the source switch device from which port the data frame is received, and a VLAN ID associated with the port of the source switch device from which port the data frame is received. If it is determined that there is no MAC address table in the source switch device, the source switch device SW-A may generate a MAC address table and including in an entry of the generated MAC address table, the source IP address, the source MAC address, a port number indicating a port of the source switch device from which port the data frame is received, and a VLAN ID associated with the port of the source switch device from which port the data frame is received. In this example, the source switch device SW-A may update its MAC address table by adding the source IP address 30.0.0.2, the source MAC address A-0-0-0-0-2, a port number 3 indicating a port of the source switch device from which port the data frame is received, and a VLAN ID 15 associated with the port of the source switch device from which port the data frame is received.

SW-A: A MAC address table according to some embodiments is exemplified below:

| port | VLAN | MAC address | IP address |
|------|------|-------------|------------|
| 3 | 15 | A-0-0-0-0-2 | 30.0.0.2 |

The port number, VLAN ID, and MAC address are three fields in a standard MAC address table in a switch device. According to some example embodiments, a standard MAC address table has been modified by adding an extra field for the source IP address. The modified MAC address table from a standard MAC address table may be referred to as a MIP (MAC-IP) address table.

d) As this is an ARP request, the source switch device SW-A may replace the sender MAC address of the ARP request with information comprising: the switch ID of the source switch device, the VLAN ID associated with the port of the source switch device from which port the data frame is received, and the source IP address of the data frame. The source MAC address of the ARP request may be modified in a similar way as the sender MAC address, where the source MAC address is replaced with information comprising: the switch ID of the source switch device, the VLAN ID associated with the port of the source switch device from which port the data frame is received, and the source IP address of the data frame.

Optionally, MAC address has a total size of the size of 6 byes (48 bits). The source IP address may have a fixed size of 4 bytes (32 bits). Optionally, the sizes of the other two fields, Switch ID and VLAN ID are changeable.

Considering a MAC address of 48 bits including 32 bits for the source IP address, 16 bits remain to be assigned to Switch ID and VLAN ID. Depending on different network topology, how many bits to be assigned for switch ID and for VLAN ID may be variable. For instance, 4 bits may be assigned to switch ID, and 12 bits may be assigned for VLAN ID. In this case, up to 16 (i.e., 24) switch devices and 4096 (i.e., 212) VLANs are supported.

According to some example embodiments, the number of VLAN ID may be increased from 4096 to several million. In a standard 802.1Q data frame, 12 bits are to be assigned for VLAN ID, which can support up to 4096 VLAN ID. In situations where the total number of VLANs in a network topology exceeds the available number of VLANs resulting from the bits assigned in the MIP address table, the 802.1Q header may be used as an extra field in the data frame. The combination of 12 bits of 802.1Q header and 12 bits are assigned in the proposed MAC address table, i.e., MAC-IP table, will lead to more than 8 million VLANs.

According to some embodiments, 8 bits (1 Byte) are assigned for Switch ID, and 8 bits (1 Byte) are assigned for VLAN ID. The remaining 32 bits (4 Bytes) are used for the source IP address.

The original Source MAC address of the data frame is A-0-0-0-0-2.

| $1^{st}$ byte | $2^{nd}$ byte | $3^{rd}$ byte | $4^{th}$ byte | 5th byte | $6^{th}$ byte |
|---------------|---------------|---------------|---------------|----------|---------------|
| A | 0 | 0 | 0 | 0 | 2 |

The original source MAC address may be modified with information comprising: the switch ID 10, the VLAN ID 15 associated with the port of the source switch device from which port the data frame is received, and the source IP address 30.0.0.2.

The modified source MAC address can be seen below:

| SW-ID | VLAN | IP Address | | | |
|-------|------|------------|---|---|---|
| 10 | 15 | 30 | 0 | 0 | 2 |

This replacement of the original source MAC address for an ARP request may be referred to as "MIPS ARP Replacement".

Optionally, the original sender MAC address may also be modified with information comprising: the switch ID 10, the VLAN ID 15 associated with the port of the source switch device from which port the data frame is received, and the source IP address 30.0.0.2.

At source switch device SW-A, a modified ARP request where both the sender MAC address and the source MAC address have been modified can be seen below.

| Layer 2 address | | ARP (request) | | | |
|---|---|---|---|---|---|
| Destination MAC address | Source MAC address | Sender MAC address | Sender IP address | Target MAC address | Target IP address |
| "FF" | 10-15-30-0-0-2 | 10-15-30-0-0-2 | 30.0.0.2 | 00 | 30.0.0.3 | e) Except for the ingress port, the source switch device may flood the modified ARP request on all ports with the same VLAN ID as the ingress port, or ports with VLAN ID 0.

This type of flooding of the modified ARP request may be referred to as "MIPS Flooding".

f) The next switch device SW-C receives the data frame which is a modified ARP request. Because this data frame arrives at a switch port, there is no MAC address learning, and this switch device SW-C is either a transit switch device or a destination switch device. In this case, the switch device SW-C may need to update its switch table. The switch fetches the SW-ID from the frame's modified source MAC address field. Then the switch updates the SW-ID table by mapping that ID and the port number of the ingress port. The switch table may also be referred to as a SW-ID table.

The step of updating the switch table may be referred to as "MIPS SW-ID registration".

Source MAC address field of the arrived frame is shown below. The switch device SW-C may obtain or fetch from the source MAC address field of the received modified data frame the switch ID 10 (as shown in bold font below).

| SW-ID | VLAN | IP Address | | | |
|---|---|---|---|---|---|
| 10 | 15 | 30 | 0 | 0 | 2 |

The switch device SW-C may determine if there is a switch table. If it is determined that there is no switch table in the switch device SW-C, it may generate a switch table. The switch device SW-C may include in an entry of the generated switch table, the fetched switch ID 10 and a port number 1 indicating a port of the transit switch device from which port the modified data frame is received.

If it is determined that there is a switch table in the switch device SW-C, and if the switch table does not include an entry comprising the fetched switch ID 10 and the port number 1 indicating the port of the switch device from which port the modified data frame is received, the switch device may include in an entry of the switch table, the fetched switch ID and the port number 1 indicating the port of the switch device from which port the modified data frame is received.

The switch table at switch device SW-C is exemplified below. The term switch port may be interchangeable with a gateway port, or an arch port.

| SW-ID | Port |
|---|---|
| 10 | 1 |

For each received modified data frame, the switch device SW-C may map the fetched switch ID and the switch/arch port from which port the modified data frame is received into the switch table.

g) The switch device SW-C may flood the data frame based on the "MIPS Flooding" procedure, that is, except for the ingress port, the switch device floods the data frame on all ports with a same VLAN ID as that for the ingress port, or ports having VLAN ID 0. The switch device SW-C may send out the data frame through port 2.

The transit switch device SW-C may only look at L2 part of the data frame to route the data frame. For a transit switch device or a destination switch device, it may not be necessary to generate a MAC address table and register the MAC address of the incoming data frame.

h) The next switch device SW-B receives the data frame. Because this data frame arrives at a switch/Arch port, optionally, there is no MAC address learning, and this switch device is either a transit switch device or a destination switch device. The switch device may run the "MIPS SW-ID Registration" process as described above, where the switch table is updated by including in an entry of the switch table, the fetched switch ID and a port number indicating a port of the switch device from which port the modified data frame is received.

The switch table at switch device SW-B may be exemplified below, with an entry including the fetched switch ID 10 and the port number 1.

| SW-ID | Port |
|---|---|
| 10 | 1 | i) As this is a broadcast frame, the switch device SW-B may flood the frame based on the "MIPS Flooding" process as described above. That is, except for the ingress port, the switch device SW-B may flood the modified ARP request on all ports with the same VLAN ID as the ingress port, or ports with VLAN ID 0.

The modified ARP request may be exemplified as shown below:

| Layer 2 address | | ARP (request) | | | |
|---|---|---|---|---|---|
| Destination MAC address | Source MAC address | Sender MAC address | Sender IP address | Target MAC address | Target IP address |
| "FF" | 10-15-30-0-0-2 | 10-15-30-0-0-2 | 30.0.0.2 | 00 | 30.0.0.3 | j) Among all nodes that receive this modified ARP request that is a broadcast frame, a destination node Node-D sees its IP address (30.0.0.3) as the target IP address and accepts therefore the ARP request.

The switch device SW-B may only look at L2 part of the data frame to route the data frame. For a transit switch device or a destination switch device, it may not be necessary to generate a MAC address table and register the MAC address of the incoming data frame.

The source and sender MAC address entry of this arrived data frame to the destination node, Node-D, is not the original MAC address of the source node, Node-A. Instead, it is the modified MAC address, although Node-D is unaware of the modification of the MAC address.

The transmission of an ARP request from a source node Node-A to a destination node Node-D is thus completed.

2) A Second Example: An ARP Reply

The procedure of sending an ARP reply from a node to respond to an ARP request sent by another node is very similar to that of sending an ARP request. The main difference is that switch devices don't flood the data frame this time because the ARP reply is a type of unicast frame. In this example, it is assumed that the destination switch device is switch device SW-A that previously sends the ARP request.

a) A source node, Node-D, generates and sends out an ARP reply to a destination node Node-A.

The ARP Reply generated by Node-D is exemplified below:

IP address table). If it is determined that there is a MAC address table in the source switch device, and if the MAC address table in the source switch device does not include an entry comprising the source IP address and the source MAC address, the source switch device SW-B includes in an entry of the MAC address table, the source IP address, the source MAC address, a port number indicating a port of the source switch device from which port the data frame is received, and a VLAN ID associated with the port of the source switch device from which port the data frame is received. If it is determined that there is no MAC address table in the source switch device, the SW-B generates a MAC address table and includes in an entry of the generated MAC address table, the source IP address, the source MAC address, a port number indicating a port of the source switch device from which port the ARP reply is received, and a VLAN ID associated with the port of the source switch device from which port the ARP reply is received.

SW-B: A MAC address table (i.e., MAC-IP address table) according to some embodiments is exemplified below:

| port | VLAN | MAC address | IP address |
|---|---|---|---|
| 6 | 15 | D-0-0-0-0-2 | 30.0.0.3 |

| Layer 2 address | | ARP (reply) | | | |
|---|---|---|---|---|---|
| Destination MAC address | Source MAC address | Sender MAC address | Sender IP address | Target MAC address | Target IP address |
| 10-15-30-0-0-2 | D-0-0-0-0-3 | D-0-0-0-0-3 | 30.0.0.3 | 10-15-30-0-0-2 | 30.0.0.2 |

As shown from the example of the ARP reply, the destination MAC address field in the ARP reply came from the source MAC address field of the arrived ARP request, that is, the destination MAC address field in the ARP reply has the same value as the source MAC address field of the arrived ARP request.

The destination MAC address field of the ARP reply is not the original real MAC address of Node-A. Instead, it holds the modified MAC address of the ARP request that has been modified at SW-A. The source MAC address of the ARP reply is the original real MAC address of the Node-D. The source MAC address of the ARP reply may be modified in the next step.

b) The first directly connected switch device SW-B receives the ARP reply which is a unicast frame.

c) As this is an ARP reply that arrives from an access port, the first directly connected switch device SW-B may be referred to as a source switch device. The SW-B looks at both the L2 & L3 parts of the ARP reply, and determines if there is a MAC address table (i.e., MACd) The source switch device SW-B may run the "MIPS ARP Replacement" process as described above.

SW-B may modify the source and sender MAC address of the ARP reply. SW-B may replace the source MAC address of the received data frame with information comprising: the switch ID, the VLAN ID associated with the port of the source switch device from which port the data frame is received, and the source IP address. Similarly, SW-B may replace the sender MAC address of the received data frame with information comprising: the switch ID, the VLAN ID associated with the port of the source switch device from which port the data frame is received, and the source IP address.

The original source MAC address, corresponding to the MAC address of the node Node-D, is exemplified below:

| 1$^{st}$ byte | 2$^{nd}$ byte | 3$^{rd}$ byte | 4$^{th}$ byte | 5th byte | 6$^{th}$ byte |
|---|---|---|---|---|---|
| D | 0 | 0 | 0 | 0 | 3 |

Considering SW-ID (1 byte) with a value of 11, VLAN ID with a value of 15, and a source IP address of the data frame (4 bytes) with 30.0.0.3, the modified source MAC address is exemplified below. The positions for the switch ID (SW-ID), VLAN ID and IP address as shown below are only for illustration purpose, and their positions may be different in certain embodiments.

| SW-ID | VLAN | IP Address | | |
|---|---|---|---|---|
| 11 | 15 | 30 | 0 | 0 | 3 |

Similarly, the modified sender MAC address is exemplified below:

| SW-ID | VLAN | IP Address | | |
|---|---|---|---|---|
| 11 | 15 | 30 | 0 | 0 | 3 |

The modified ARP Reply at SW-B is exemplified below, where both the source MAC address and sender MAC address may have been modified at SW-B.

| Layer 2 address | | ARP (reply) | | | |
|---|---|---|---|---|---|
| Destination MAC address | Source MAC address | Sender MAC address | Sender IP address | Target MAC address | Target IP address |
| 10-15-30-0-0-2 | 11-15-30-0-0-3 | 11-15-30-0-0-3 | 30.0.0.3 | 10-15-30-0-0-2 | 30.0.0.2 |

The switch device SW-B may forward the data frame. Optionally, SW-B looks at the destination MAC address field of the data frame, and fetches or acquires a switch ID of a destination switch device. SW-B may then look up this switch ID in its switch table to determine the port for this switch ID. This process of making forwarding decision may be referred to as "MIPS Next Switch Forwarding".

As an example, the switch device SW-B may fetch the switch ID (SW-ID) from the $1^{st}$ byte of the destination MAC address field of the arrived data frame. The word "fetch" may mean acquire a piece of data. Optionally, the switch ID is placed in another position than the $1^{st}$ byte of the destination MAC address field. Optionally, the position of the switch ID is pre-defined or pre-configured, and the switch device SW-B has been informed the position of the switch ID.

| Destination MAC address |
|---|
| 10-15-30-0-0-2 |

Optionally, at the switch device SW-B, there is a switch table. Optionally, the switch table has an entry including switch ID 10 as exemplified below. In this example, the switch ID 10 is associated with a port number 1, which indicates the port from which the data frame should be forwarded.

| SW-ID | Port |
|---|---|
| 10 | 1 |

Optionally, the switch device SW-B finds port 1 that is associated with switch ID 10, and forwards the data frame to the next switch device through port 1.

e) The next switch device SW-C receives the data frame ARP reply. Because this data frame arrives from an arch port, this switch device is either a transit or a destination switch device. Optionally, the switch device SW-C runs the "MIPS SW-ID Registration" procedure as described above, which relates to the step of updating the switch table. Optionally, the switch device SW-C fetches the switch ID (SW-ID) from the $1^{st}$ byte of the source MAC address field of the arrived data frame, which is 11 in this example.

| Source MAC address |
|---|
| 11-15-30-0-0-3 |

If it is determined that there is a switch table in the switch device SW-C, and if the switch table in the switch device SW-C does not include an entry comprising the fetched switch ID 11 and the port number indicating the port of the switch device from which port the modified data frame is received, the switch device SW-C includes in an entry of the switch table, the fetched switch ID 11 and the port number 2 indicating the port of the switch device SW-C from which port the modified data frame is received.

SW-C: The updated switch table is exemplified below, where a new entry has been added, where the switch ID 11 is associated with the port number 2.

| SW-ID | Gateway Port |
|---|---|
| 11 | 2 |
| 10 | 1 | f) Because the switch ID inside the destination MAC address field of the arrived data frame is 10, which is different from the SW-C's switch ID, SW-C needs to forward the data frame. The switch device SW-C may forward the data frame based on the "MIPS Next Switch Forwarding" procedure described above, where relates to the step of making forwarding decisions.

The switch device SW-C fetches the switch ID (SW-ID) from the destination MAC address field of the frame. In this example, the SW-ID of the destination switch device is 10 as shown below.

| Destination MAC address |
|---|
| 10-15-30-0-0-2 |

In the switch table at SW-C as shown below, port 1 is associated with the switch ID 10. In other words, port 1 is mapped to the switch ID 10 (as shown in bold font below). Therefore, the data frame is forwarded to the next switch device through the port 1.

SW-C: Switch Table:

| SW-ID | Port |
| --- | --- |
| 11 | 2 |
| 10 | 1 |

Optionally, for an ARP reply frame, a transit switch device only looks at the L2 part of the data frame for routing the data frame.

g) The next switch device SW-A receives the ARP reply frame. Because this data frame arrives from an arch port, this switch device SW-A is either a transit or a destination switch device, and there may be no MAC address learning. Optionally, the switch device runs the "MIPS SW-ID Registration" process as described above.

SW-A may fetch the switch ID (SW-ID) from the 1st byte of the source MAC address field of the arrived data frame. The switch ID is 11 in this example. If it is determined that there is a switch table in the switch device SW-A, and if the switch table in the switch device SW-A does not include an entry comprising the fetched switch ID 11 and the port number indicating the port of the switch device from which port the modified data frame is received, the switch device SW-A includes in an entry of the switch table, the fetched switch ID 11 and the port number 1 indicating the port of the switch device SW-A from which port the modified data frame is received.

| Source MAC address |
| --- |
| 11-15-30-0-0-3 |

SW-A: The updated switch table is exemplified below, where a new entry has been added and the switch ID 11 is associated with the port number 1.

SW-ID Table:

| SW-ID | Port |
| --- | --- |
| 11 | 1 | h) Optionally, the switch device SW-A fetches or obtains the switch ID from the destination MAC address field of the arrived data frame. In this example, the fetched switch ID from the destination MAC address field of the arrived data frame is 10 (as shown in bold font below), which is the same switch ID as SW-A's own switch ID. Therefore, the switch device SW-A is a destination switch device.

| Destination MAC address |
| --- |
| 10-15-30-0-0-2 |

Optionally, SW-A replaces the modified destination and target MAC address field of the ARP Reply frame with the original MAC address of the destination node.

To do so, SW-A may fetch the IP address from the modified destination MAC address field of the data frame. In this example, the IP address is 30-0-0-2, as shown in bold font below.

| Destination MAC address |
| --- |
| 10-15-30-0-0-2 |

Optionally, the switch device SW-A looks up this IP address in its MAC address table (i.e., MAC-IP address table) to find the original MAC address associated with the IP address 30-0-0-2. In this example, the IP address 30-0-0-2 is associated with MAC address A-0-0-0-0-2. Both addresses are shown in bold font below.

SW-A: MAC Address Table (I.e., MAC-IP Address Table):

| port | VLAN | MAC address | IP address |
| --- | --- | --- | --- |
| 3 | 15 | A-0-0-0-0-2 | 30.0.0.2 |

Optionally, as the next step, the destination switch device SW-A replaces the modified destination and target MAC address field of the arrived data frame with the original MAC address. This step of replacement of the destination MAC address may be referred to as "MIPS ARP Reversing", so the modified destination MAC address is reversed to the original MAC address.

The arrived unicast frame (ARP Reply) at SW-A is exemplified below, where both the destination MAC address and the target MAC address are shown in bold font.

| Layer 2 address | | ARP (reply) | | | |
| --- | --- | --- | --- | --- | --- |
| Destination MAC address | Source MAC address | Sender MAC address | Sender IP address | Target MAC address | Target IP address |
| 10-15-30-0-0-2 | 11-15-30-0-0-3 | 11-15-30-0-0-3 | 30.0.0.3 | 10-15-30-0-0-2 | 30.0.0.2 |

After applying the "MIPS ARP Reversing" procedure, the modified destination and target MAC addresses Oct. 15, 1930-0-0-2 are reversed to (i.e., replaced by) the original MAC address A-0-0-0-0-2. In some example embodiments, the term "modified destination MAC address" may be used to indicate the destination MAC address that has been modified according to some embodiments. The term "modified target MAC address" may be used to indicate the target MAC address that has been modified according to some embodiments.

| Layer 2 address | | ARP (reply) | | | |
|---|---|---|---|---|---|
| Destination MAC address | Source MAC address | Sender MAC address | Sender IP address | Target MAC address | Target IP address |
| A-0-0-0-0-2 | 11-15-30-0-0-3 | 11-15-30-0-0-3 | 30.0.0.3 | A-0-0-0-0-2 | 30.0.0.2 | i) After the original MAC address of the destination node Node-A is obtained, the switch device SW-A still needs to know where to forward the data frame. To do so, optionally, SW-A looks up in the MAC address table, where a port number is associated with the MAC address. In this example, port 3 is associated with the MAC address A-0-0-0-0-2 (shown in bold font below) in the MAC address table.

SW-A: MAC Address Table (i.e., MAC-IP Table):

| port | VLAN | MAC address | IP address |
|---|---|---|---|
| 3 | 15 | A-0-0-0-0-2 | 30.0.0.2 |

Optionally, the destination switch device SW-A forwards the data frame through port 3 toward the destination node Node-A.

The step of forwarding the data frame to the destination node may be referred to as "MIPS Destination Node Forwarding".

j) In the next step, optionally, Node-A receives this data frame as its own MAC address A-0-0-0-0-2 is the same as that of the destination MAC address of the data frame.

3) A Third Example: A Unicast Frame

By the data frames ARP request and ARP reply sending between Node-A and Node-D, there is a communication link between Node-A and Node-D. In the third example, it is assumed that Node-A will send a data frame to Node-D, the data frame being a unicast frame having the source MAC address as that of Node-A and having the destination MAC address as that of Node-D.

a) In the first step, Node-A generates a unicast data frame and sends it out.

The unicast frame sent out by Node-A may be exemplified as below:

| Layer 2 address | | Layer 3 address | | |
|---|---|---|---|---|
| Destination MAC address | Source MAC address | Source IP address | Destination IP address | Payload |
| 11-15-30-0-0-3 | A-0-0-0-0-2 | 30.0.0.2 | 30.0.0.3 | | b) The switch device SW-A is directly connected to Node-A. SW-A receives this unicast frame. Optionally, for this typical unicast frame which is not an ARP reply, SW-A only needs to look at the L2 part of the unicast frame.

Optionally, the MAC address table at SW-A is not updated, because the MAC address table was already updated earlier when Node-A sent the ARP request.

c) As the next step, optionally, SW-A replaces the source MAC address field of the unicast frame with a modified MAC address. This step may be similar to the "MIPS ARP Replacement" procedure described above, except only the source MAC address, not the sender MAC address is modified, since this is a unicast frame and not an ARP request.

Optionally, the replacement of the source MAC address may be referred to as "MIPS Unicast Replacement".

At SW-A, the modified unicast frame is exemplified below:

| Layer 2 address | | Layer 3 address | | |
|---|---|---|---|---|
| Destination MAC address | Source MAC address | Source IP address | Destination IP address | Payload |
| 11-15-30-0-0-3 | 10-15-30-0-0-2 | 30.0.0.2 | 30.0.0.3 | | d) In the next step, optionally, the modified unicast frame is forwarded toward the destination node. Optionally, SW-A runs the "MIPS Next Switch Forwarding" procedure for making forwarding decision, and sends out the frame to the next switch. Optionally, SW-A fetches switch ID from the destination MAC address field of the modified unicast frame, which is 11 (shown in bold font below) in this example.

| Destination MAC address |
|---|
| 11-15-30-0-0-3 |

Optionally, SW-A searches in the switch table and finds an entry where the switch ID from the destination MAC address field of the modified unicast frame is included. In this example the port associated with switch ID 11 is port 1, which is shown in bold font below. SW-A then forwards the modified unicast frame through port 1.

SW-A: SW-ID Table:

| SW-ID | Port |
|---|---|
| 11 | 1 | e) The next switch device, SW-C, receives the unicast frame. Optionally, at SW-C, the "MIPS SW-ID Registration" procedure for updating the switch table is not needed, because there is already an entry in the switch table comprising the fetched switch ID from the source MAC address field, and a port number indicating the port of the switch device SW-C from which port the modified unicast frame is received. In this example, as shown below in bold font, the fetched switch ID from the source MAC address field is 10, and the port associated with switch ID 10 is port 1.

| Source MAC address |
|---|
| 10-15-30-0-0-2 |

SW-C: Switch (SW-ID) Table:

| SW-ID | Port |
|---|---|
| 10 | 1 |
| 11 | 2 | f) Optionally, for this modified unicast frame, SW-C runs the "MIPS Next Switch Forwarding" procedure and forwards the unicast frame toward the next switch device through port 2. Optionally, SW-C fetches switch ID from the destination MAC address field of the modified unicast frame, which is 11 in this example. Optionally, SW-A searches in the switch table and finds an entry where the switch ID 11 from the destination MAC address field of the modified unicast frame is included. In this example the port associated with switch ID 11 is port 2. SW-A then forwards the modified unicast frame through port 2.

g) The next switch device, SW-B, receives the modified unicast frame. Optionally, at SW-B, there is no need to run the "MIPS SW-ID Registration" either, because there is already an entry in SW-B's switch table comprising the fetched switch ID from the source MAC address field, and a port number indicating the port of the switch device SW-B from which port the modified unicast frame is received. In this example, as shown below in bold font, the fetched switch ID from the source MAC address field is 10, and the port associated with switch ID 10 is port 1, which is an existing entry in the switch table.

h) SW-B: Switch (SW-ID) Table:

| SW-ID | Port |
|---|---|
| 10 | 1 |

Optionally, SW-B fetches switch ID from the destination MAC address field of the modified unicast frame, which is 11 (shown in bold font below) in this example. Because the fetched switch ID from the destination MAC address field of the arrived unicast frame is the same as SW-B's own switch ID, SW-B is a destination switch device.

| Destination MAC address |
|---|
| 11-15-30-0-0-3 |

Optionally, as a destination switch device, SW-B needs to replace the modified destination MAC address field of the frame with the original MAC address of the destination node. Optionally, this process is similar to the "MIPS ARP Reversing" procedure described above, except that for a unicast frame, different from an ARP Reply, SW-B only needs to replace the destination MAC address and not the target MAC address.

At SW-B, the arrived modified unicast frame is exemplified below, where the destination MAC address is not the original destination MAC address. By "original destination MAC address" it may mean the destination MAC address correspond to the MAC address of a node, that has not been modified according to some embodiments as described.

| Layer 2 address | | Layer 3 address | | |
|---|---|---|---|---|
| Destination MAC address | Source MAC address | Source IP address | Destination IP address | Payload |
| 11-15-30-0-0-3 | 10-15-30-0-0-2 | 30.0.0.2 | 30.0.0.3 | |

Optionally, SW-B fetches IP address from the destination MAC address field of the arrived modified unicast frame, which is 30-0-0-3 in this example. Optionally, SW-B searches its MAC address table, and find an entry in the MAC address table including the IP address 30-0-0-3. In the entry including the IP address 30-0-0-3, the MAC address associated with the IP address 30-0-0-3 is D-0-0-0-0-2 (as shown below in bold font).

SW-B: A MAC Address Table (i.e., MAC-IP Table) According to Some Embodiments is Exemplified Below:

| port | VLAN | MAC address | IP address |
|---|---|---|---|
| 6 | 15 | D-0-0-0-0-2 | 30.0.0.3 |

Optionally, at SW-B, the destination MAC address of the unicast frame is replaced by (i.e., revered to) the original MAC address D-0-0-0-0-2 (shown in bold font below).

| Layer 2 address | | Layer 3 address | | |
|---|---|---|---|---|
| Destination MAC address | Source MAC address | Source IP address | Destination IP address | Payload |
| D-0-0-0-0-3 | 10-15-30-0-0-2 | 30.0.0.2 | 30.0.0.3 | |

Optionally, the process of replacing of the destination MAC address may be referred to as "MIPS Unicast Reversing".

At SW-B, the process of forwarding the data frame to the destination node, Node-D, may be referred to as "MIPS Destination Node Forwarding". Optionally, in the same entry of the MAC address table including the MAC address D-0-0-0-0-2, there is a port number 6. Optionally, SW-B forwards the unicast frame through the port 6.

1) In this example, Node-D receives this unicast frame since its own MAC address is the same as that of the destination MAC address of the unicast frame.

FIG. 2 is a flowchart of a method 200 for switching data frames in a communications network according to some example embodiments. The communications network comprises a plurality of switch devices including a source switch device, wherein the source switch device is provided with a switch identifier, switch ID, and wherein each port of the source switch device is provided with a port number, and each port of the source switch device is associated with a virtual local area network identifier, VLAN ID. The method is performed by a source switch device. The method comprises the following steps. At step 210, the method comprises receiving a data frame from a source host node that is connected to the source switch device, wherein the data frame includes a source Media Access Control, MAC, address of the source host node, and a source Internet Protocol, IP, address of the source host node. At step 220, the method comprises modifying the data frame by replacing the source MAC address of the received data frame with information comprising: the switch ID, a VLAN ID associated with a port of the source switch device from which port the data frame is received, and the source IP address. At step 230, the method comprises determining if there is a MAC address table in the source switch device. At step 240, if it is determined that there is a MAC address table in the source switch device, and if the MAC address table in the source switch device does not include an entry comprising the source IP address and the source MAC address, the method comprises including in an entry of the generated MAC address table, the source IP address, the source MAC address, a port number indicating a port of the source switch device from which port the data frame is received, and a VLAN ID associated with the port of the source switch device from which port the data frame is received. If it is determined that there is no MAC address table in the source switch device, the method comprises generating a MAC address table and including in an entry of the generated MAC address table, the source IP address, the source MAC address, a port number indicating a port of the source switch device from which port the data frame is received, and a VLAN ID associated with the port of the source switch device from which port the data frame is received. At step 250, the method comprises forwarding or flooding the modified data frame to at least one switch device of the plurality of switch devices.

A source host node may be referred to as a source node. Similarly, a destination host node may be referred to as a destination node.

In some embodiments, at least 12 bits of the source MAC address field of the received data frame are configured for VLAN ID.

In some embodiments, a switch ID is obtained for each of the plurality of switch devices. Optionally, the switch ID for each of the plurality of switch devices is pre-configured or pre-determined.

In some embodiments, the data frame includes a sender MAC address, and the method further comprises replacing the sender MAC address of the received data frame with information comprising: the switch ID, the VLAN ID associated with the port of the source switch device from which port the data frame is received, and the source IP address.

In some embodiments, if the data frame is a unicast message or an Address Resolution Protocol (ARP) reply message, the method further comprises fetching a switch ID from a destination MAC address field of the received data frame, and determining an entry of a switch table of the source switch device, where the fetched switch ID from the destination MAC address field of the received data frame is associated with a port number in the entry of the switch table, and forwarding the data frame through a port indicated by the port number to another switch device of the plurality of switch devices. A unicast message may also be referred to as a unicast frame. An ARP reply message may also be referred to as an ARP reply frame. Fetching a switch ID may mean acquiring or identifying a switch ID. Fetching by itself may mean acquiring a piece of data.

FIG. 3 is a flowchart of a method 300 performed by a transit switch device for switching data frames in a communications network comprising a plurality of switch devices including the transit switch device. At step 310, the method comprises receiving a modified data frame from a source switch device, wherein the modified data frame is modified from a data frame including a source Media Access Control, MAC, address of the source host node, and a source Internet Protocol, IP, address of the source host node, by replacing the source MAC address of the data frame with information comprising: a switch ID of the source switch device, a VLAN ID associated with a port of the source switch device from which port the data frame is received, and a source IP address of the source host node. At step 320, the method comprises fetching from a source MAC address field of the received modified data frame, the switch ID of the source switch device. At step 330, the method comprises determining if there is a switch table in the transit switch device. If it is determined that there is no switch table in the transit switch device, the method comprises generating a switch table, and including in an entry of the generated switch table, the fetched switch ID and a port number indicating a port of the transit switch device from which port the modified data frame is received. If it is determined that there is a switch table in the transit switch device, and if the switch table in the transit switch device does not include an entry comprising the fetched switch ID and the port number indicating the port of the transit switch device from which port the modified data frame is received, the method comprises including in an entry of the switch table, the fetched switch ID and the port number indicating the port of the transit switch device from which port the modified data frame is received. At step 340, the method comprises forwarding or flooding the modified data frame to at least one switch device of the plurality of switch devices.

In some embodiments, if the modified data frame is a unicast message or an ARP reply message, the method further comprising fetching a switch ID from a destination MAC address field of the modified data frame, and determining an entry of a switch table of the transit switch device, where the fetched switch ID from the destination MAC address field of the modified data frame is associated with a port number in the entry of the switch table, and forwarding the modified data frame through a port indicated by the port number to another switch device of the plurality of switch devices.

FIG. 4 is a flowchart of a method 400 performed by a destination switch device, for switching data frames in a communications network comprising a plurality of switch devices including the destination switch device. At step 410, the method comprises receiving a modified data frame from a transit switch device, wherein the modified data frame is modified from a data frame including a source Media Access Control, MAC, address of the source host node, and a source Internet Protocol, IP, address of a source host node, by replacing the source MAC address of the data frame with information comprising: a switch ID of a source switch device, a VLAN ID associated with a port of the source switch device from which port the data frame is received, and a source IP address of the source host node. At step 420, the method comprises fetching from a source MAC address field of the received modified data frame, the switch ID of the source switch device. At step 430, the method comprises determining if there is a switch table in the destination switch device. If it is determined that there is no switch table in the destinations witch device, the method comprises generating a switch table, and including in an entry of the generated switch table, the fetched switch ID and a port number indicating a port of the destination switch device from which port the modified data frame is received. If it is determined that there is a switch table in the destination switch device, and if the switch table in the destination switch device does not include an entry comprising the fetched switch ID and the port number indicating the port of the destination switch device from which port the modified data frame is received, the method comprises including in an entry of the switch table, the fetched switch ID and the port number indicating the port of the destination switch device from which port the modified data frame is received. At step 440, the method comprises forwarding or flooding the received modified data frame to at least a destination host node that is connected to the destination switch device. In some embodiments, if the modified data frame is a unicast message or an ARP reply message, the method further comprises fetching a switch ID from a destination MAC address field of the modified data frame, and determining an entry of a switch table of the destination switch device, wherein the fetched switch ID from the destination MAC address field of the modified data frame is associated with a port number in the entry of the switch table, wherein the fetched switch ID from the destination MAC address field of the modified data frame is the same as a switch ID of the destination switch device, and the method comprises forwarding the modified data frame through a port indicated by the port number to the destination host node.

In some embodiments, the modified data frame is a modified broadcast frame or a modified broadcast message.

In some embodiments, each port of a switch device of the plurality of switch devices is provided with a port number, and each port of a switch device of the plurality of switch devices is associated with a VLAN ID.

In some embodiments, the modified data frame is configured to pass through a port of a switch device of the plurality of switch devices if a VLAN ID associated with the port of the switch device is equal to 0, or if the modified data frame has a same VLAN ID as that associated with the port of the switch device.

FIG. 5 illustrates a source switch device 500 in a simplified block diagram. As shown in FIG. 5, the source switch device 500 comprises at least a processing circuit or a processing module or a processor 510; a memory module 520. The source switch device 500 may comprise a receiver circuit or receiver module 540; a transmitter circuit or transmitted module 550, or a transceiver circuit or transceiver module 530 which may include the transmitter circuit 550 and the receiver circuit 540. The source switch device 500 may support any radio access technology including 2G, 3G, 4G, 5G, Wifi, Wimax, etc., or a combination thereof.

The processing module/circuit 510 includes a processor, microprocessor, an application specific integrated circuit (ASIC), field programmable gate array (FPGA), or the like, and may be referred to as the "processor 510." The processor 510 controls the operation of the source switch device and its components. Memory (circuit or module) 520 includes a random-access memory (RAM), a read only memory (ROM), and/or another type of memory to store data and instructions that may be used by processor 510. In general, it will be understood that the source switch device 500 in one or more embodiments includes fixed or programmed circuitry that is configured to carry out the operations according to some embodiments disclosed in this disclosure that are performed by the source switch device.

The processor 510 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the source switch device 500 disclosed herein. According to some embodiments, the source switch device 500 comprises a processor 510 and a memory 520, the memory 520 containing instructions executable by the processor, for switching data frames in a communications network comprising a plurality of switch devices including the source switch device, wherein the source switch device is provided with a switch identifier, switch ID, and wherein each port of the source switch device is provided with a port number, and each port of the source switch device is associated with a virtual local area network identifier, VLAN ID, whereby the source switch device 500 is operative to:

receive a data frame from a source host node that is connected to the source switch device, wherein the data frame includes a source Media Access Control, MAC, address of the source host node, and a source Internet Protocol, IP, address of the source host node;

modify the data frame by replacing the source MAC address of the received data frame with information comprising: the switch ID, a VLAN ID associated with a port of the source switch device from which port the data frame is received, and the source IP address;

determine if there is a MAC address table in the source switch device;

if it is determined that there is a MAC address table in the source switch device, and if the MAC address table in the source switch device does not include an entry comprising the source IP address and the source MAC address, include in an entry of the MAC address table, the source IP address, the source MAC address, a port number indicating a port of the source switch device from which port the data frame is received, and a VLAN ID associated with the port of the source switch device from which port the data frame is received;

if it is determined that there is no MAC address table in the source switch device, generate a MAC address table and include in an entry of the generated MAC address table, the source IP address, the source MAC address, a port number indicating a port of the source switch device from which port the data frame is received, and a VLAN ID associated with the port of the source switch device from which port the data frame is received; and forward or flood the modified data frame to at least one switch device of the plurality of switch devices.

According to some embodiments, a switch ID is obtained for each of the plurality of switch devices.

According to some embodiments, the data frame includes a sender MAC address, and the source switch device is operative to replace the sender MAC address of the received data frame with information comprising: the switch ID, the VLAN ID associated with the port of the source switch device from which port the data frame is received, and the source IP address.

According to some embodiments, if the received data frame is a unicast message or an Address Resolution Protocol (ARP) reply message, the source switch device is further operative to fetch a switch ID from a destination MAC address field of the received data frame, and determine an entry of a switch table of the source switch device, where the fetched switch ID from the destination MAC address field of the received data frame is associated with a port number in the entry of the switch table, and forward the received data frame through a port indicated by the port number to another switch device of the plurality of switch devices.

According to some embodiments, each port of a switch device of the plurality of switch devices is provided with a port number, and each port of a switch device of the plurality of switch devices is associated with a VLAN ID.

According to some embodiments, the modified data frame is configured to pass through a port of a switch device of the plurality of switch devices if a VLAN ID associated with the port of the switch device is equal to 0, or if the modified data frame has a same VLAN ID as that associated with the port of the switch device.

There is also provided a computer program comprising instructions which when executed on at least one processor 510 of the source switch device 500, cause the at least one processor 510 to carry out some embodiments as described herein.

Figure 6:
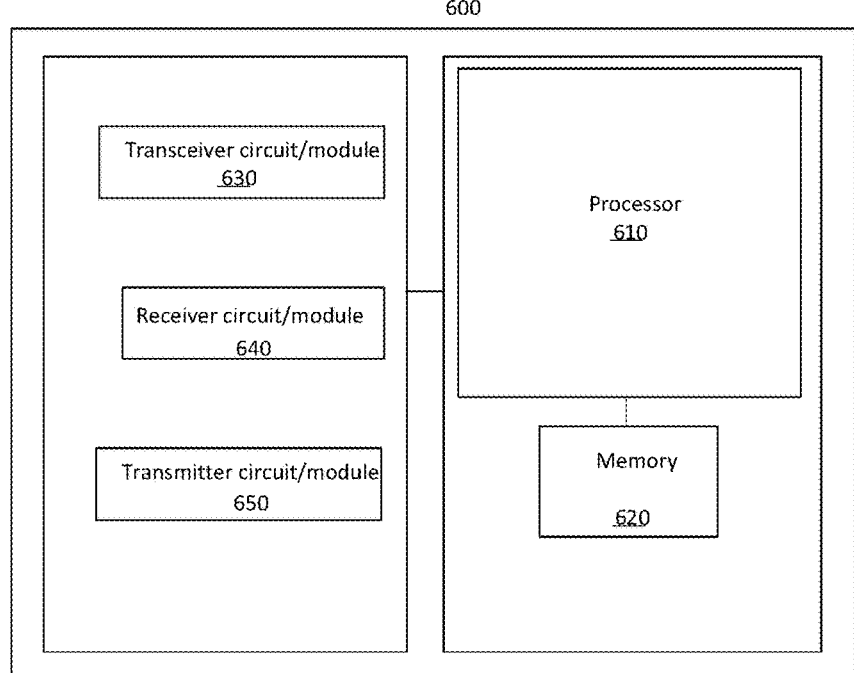
FIG. 6 illustrates a block diagram of a transit switch device, according to some embodiments.

FIG. 6 illustrates a transit switch device 600 in a simplified block diagram. As shown in FIG. 6, the transit switch device 600 comprises at least a processing circuit or a processing module or a processor 610; a memory module 620. The transit switch device 500 may comprise a receiver circuit or receiver module 640; a transmitter circuit or transmitted module 650, or a transceiver circuit or transceiver module 630 which may include the transmitter circuit 650 and the receiver circuit 640. The transit switch device 600 may support any radio access technology including 2G, 3G, 4G, 5G, Wifi, Wimax, etc., or a combination thereof.

The processing module/circuit 610 includes a processor, microprocessor, an application specific integrated circuit (ASIC), field programmable gate array (FPGA), or the like, and may be referred to as the "processor 610." The processor 610 controls the operation of the transit switch device and its components. Memory (circuit or module) 620 includes a random-access memory (RAM), a read only memory (ROM), and/or another type of memory to store data and instructions that may be used by processor 610. In general, it will be understood that the transit switch device 600 in one or more embodiments includes fixed or programmed circuitry that is configured to carry out the operations according to some embodiments disclosed in this disclosure that are performed by the transit switch device.

The processor 610 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 610 to carry out the operations of the transit switch device 600 disclosed herein.

According to some embodiments, the transit switch device 600 for switching data frames in a communications network comprising a plurality of switch devices including the transit switch device is disclosed. The transit switch device 600 comprises a processor 610 and a memory 620, the memory 620 containing instructions executable by the processor 610, whereby the transit switch device 600 is operative to:

receive a modified data frame from a source switch device, wherein the modified data frame is modified from a data frame including a source Media Access Control, MAC, address of the source host node, and a source Internet Protocol, IP, address of the source host node, by replacing the source MAC address of the data frame with information comprising: a switch ID of the source switch device, a VLAN ID associated with a port of the source switch device from which port the data frame is received, and a source IP address of the source host node;

fetch from a source MAC address field of the received modified data frame, the switch ID of the source switch device;

determine if there is a switch table in the transit switch device;

if it is determined that there is no switch table in the transit switch device, generate a switch table, and including in an entry of the generated switch table, the fetched switch ID and a port number indicating a port of the transit switch device from which port the modified data frame is received;

if it is determined that there is a switch table in the transit switch device, and if the switch table in the transit switch device does not include an entry comprising the fetched switch ID and the port number indicating the port of the transit switch device from which port the modified data frame is received, include in an entry of the switch table, the fetched switch ID and the port number indicating the port of the transit switch device from which port the modified data frame is received; and forward or flood the modified data frame to at least one switch device of the plurality of switch devices.

According to some embodiments, if the modified data frame is a unicast message or an ARP reply message, the transit switch device is further operative to fetch a switch ID from a destination MAC address field of the modified data frame, and determine an entry of a switch table of the transit switch device, where the fetched switch ID from the destination MAC address field of the modified data frame is associated with a port number in the entry of the switch table, and forward the modified data frame through a port indicated by the port number to another switch device of the plurality of switch devices.

There is also provided a computer program comprising instructions which when executed on at least one processor 610 of the transit switch device 600, cause the at least one processor 610 to carry out some embodiments as described herein.

Figure 7:
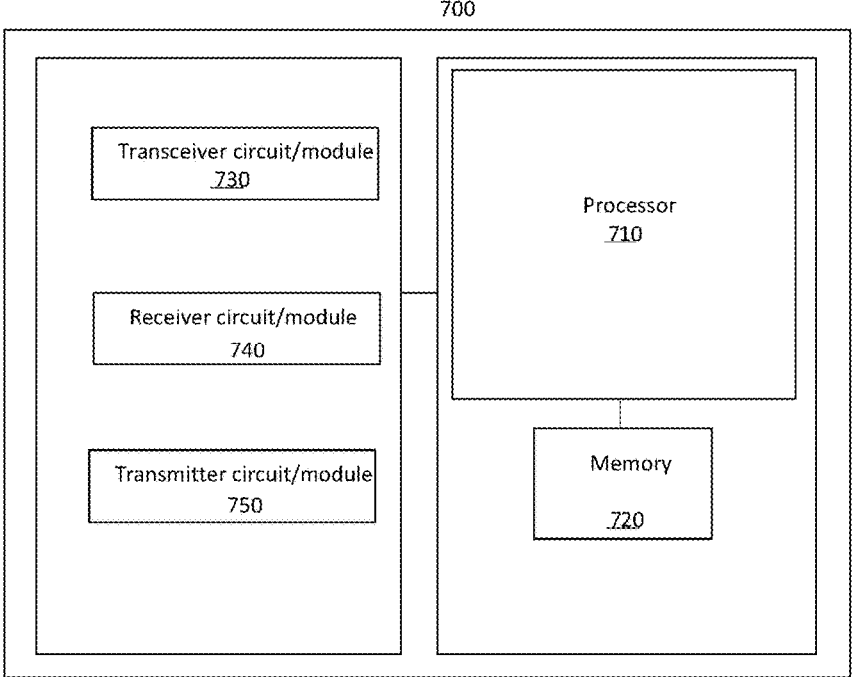
FIG. 7 illustrates a block diagram of a destination switch device, according to some embodiments.

FIG. 7 illustrates a destination switch device 700 in a simplified block diagram. As shown in FIG. 7, the destination switch device 700 comprises at least a processing circuit or a processing module or a processor 710; a memory module 720. The destination switch device 700 may comprise a receiver circuit or receiver module 740; a transmitter circuit or transmitted module 750, or a transceiver circuit or transceiver module 730 which may include the transmitter circuit 750 and the receiver circuit 740. The destination switch device 700 may support any radio access technology including 2G, 3G, 4G, 5G, Wifi, Wimax, etc., or a combination thereof.

The processing module/circuit 710 includes a processor, microprocessor, an application specific integrated circuit (ASIC), field programmable gate array (FPGA), or the like, and may be referred to as the "processor 710." The processor 710 controls the operation of the destination switch device and its components. Memory (circuit or module) 720 includes a random-access memory (RAM), a read only memory (ROM), and/or another type of memory to store data and instructions that may be used by processor 710. In general, it will be understood that the destination switch device 700 in one or more embodiments includes fixed or programmed circuitry that is configured to carry out the operations according to some embodiments disclosed in this disclosure that are performed by the destination switch device.

The processor 710 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 710 to carry out the operations of the destination switch device 700 disclosed herein.

According to some embodiments, the destination switch device 700 for switching data frames in a communications network comprising a plurality of switch devices including the destination switch device is disclosed. The destination switch device 700 comprising a processor 710 and a memory 720, the memory 720 containing instructions executable by the processor 710 whereby the destination switch device 700 is operative to:

receive a modified data frame from a transit switch device, wherein the modified data frame is modified from a data frame including a source Media Access Control, MAC, address of the source host node, and a source Internet Protocol, IP, address of a source host node, by replacing the source MAC address of the data frame with information comprising: a switch ID of a source switch device, a VLAN ID associated with a port of the source switch device from which port the data frame is received, and a source IP address of the source host node;

fetch from a source MAC address field of the received modified data frame, the switch ID;

determine if there is a switch table in the destination switch device;

if it is determined that there is no switch table in the destinations witch device, generate a switch table, and including in an entry of the generated switch table, the fetched switch ID and a port number indicating a port of the destination switch device from which port the modified data frame is received;

if it is determined that there is a switch table in the destination switch device, and if the switch table in the destination switch device does not include an entry comprising the fetched switch ID and the port number indicating the port of the destination switch device from which port the modified data frame is received, include in an entry of the switch table, the fetched switch ID and the port number indicating the port of the destination switch device from which port the modified data frame is received; and forward or flood the received modified data frame to at least a destination host node that is connected to the destination switch device.

According to some embodiments, if the modified data frame is a unicast message or an ARP reply message, the destination switch device is further operative to fetch a switch ID from a destination MAC address field of the modified data frame, and determine an entry of a switch table of the destination switch device, wherein the fetched switch ID from the destination MAC address field of the modified data frame is associated with a port number in the entry of the switch table, wherein the fetched switch ID from the destination MAC address field of the modified data frame is the same as a switch ID of the destination switch device, and the destination switch device is further operative to forward the modified data frame through a port indicated by the port number to the destination host node.

There is also provided a computer program comprising instructions which when executed on at least one processor 710 of the destination switch device 700, cause the at least one processor 710 to carry out some embodiments as described herein.

Techniques described with respect to switch devices should be understood to be applicable to any computing device configured to receive and forward data frames/messages amongst a plurality of interconnected computing devices, regardless of the communication standard or protocol. This may include routers, gateways, and other network devices adapted to include packet-switching logic as described herein.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. The communications network may be a wired or wireless communication network such as an LTE, 4G, LTE-A (or LTE-Advanced), 5G, WiMAX, WiFi, WCDMA, GSM network, any 3GPP cellular network, or any cellular network or system.

The invention claimed is:

1. A method performed by a source switch device, for switching data frames in a communications network comprising a plurality of switch devices including the source switch device, wherein the source switch device is provided with a switch identifier (switch ID) and wherein each port of the source switch device is provided with a port number, and said each port of the source switch device is associated with a virtual local area network identifier (VLAN ID), the method comprising:

receiving a data frame from a source host node that is connected to the source switch device, wherein the data frame includes a source Media Access Control (MAC) address of the source host node, and a source Internet Protocol (IP) address of the source host node;

modifying the data frame by replacing the source MAC address of the received data frame with information comprising: the switch ID, a VLAN ID associated with a port of the source switch device from which port the data frame is received, and the source IP address;

determining that there is a MAC address table in the source switch device;

in response to determining that there is a MAC address table in the source switch device, and in response to determining that the MAC address table in the source switch device does not include an entry comprising the source IP address and the source MAC address, including in the entry of the MAC address table, the source IP address, the source MAC address, a port number indicating the port of the source switch device from which port the data frame is received, and the VLAN ID associated with the port of the source switch device from which port the data frame is received;

in response to determining that there is no MAC address table in the source switch device, generating a MAC address table and including in an entry of the generated MAC address table, the source IP address, the source MAC address, a port number indicating the port of the source switch device from which port the data frame is received, and the VLAN ID associated with the port of the source switch device from which port the data frame is received; and forwarding or flooding the modified data frame to at least one switch device of the plurality of switch devices.

2. The method according to claim 1, wherein at least 12 bits of a source MAC address field of the received data frame are configured for the VLAN ID.

3. The method according to claim 1, wherein a switch ID is obtained for said each of the plurality of switch devices.

4. The method according to claim 1, wherein the data frame includes a sender MAC address, and the method comprises replacing the sender MAC address of the received data frame with information comprising: the switch ID, the VLAN ID associated with the port of the source switch device from which port the data frame is received, and the source IP address.

5. The method according to claim 1, if the received data frame is a unicast message or an Address Resolution Protocol (ARP) reply message, the method further comprising fetching a switch ID from a destination MAC address field of the received data frame, and determining an entry of a switch table of the source switch device, where the fetched switch ID from the destination MAC address field of the received data frame is associated with a port number in the entry of the switch table, and forwarding the received data frame through a port indicated by the port number to another switch device of the plurality of switch devices.

6. The method according to claim 1, wherein the modified data frame is a modified broadcast frame or a modified broadcast message.

7. The method according to claim 1, wherein each port of a switch device of the plurality of switch devices is provided with a port number, and said each port of the switch device of the plurality of switch devices is associated with a VLAN ID.

8. The method according to claim 7, wherein the modified data frame is configured to pass through a port of the switch device of the plurality of switch devices if a VLAN ID associated with the port of the switch device is equal to 0, or if the modified data frame has a same VLAN ID as that associated with the port of the switch device.

9. A source switch device for switching data frames in a communications network comprising a plurality of switch devices including the source switch device, wherein the source switch device is provided with a switch identifier (switch ID), and wherein each port of the source switch device is provided with a port number, and said each port of the source switch device is associated with a virtual local area network identifier (VLAN ID), the source switch device comprising a processor and a memory, the memory containing instructions executable by the processor, whereby the source switch device is operative to:

receive a data frame from a source host node that is connected to the source switch device, wherein the data frame includes a source Media Access Control (MAC) address of the source host node, and a source Internet Protocol (IP) address of the source host node;

modify the data frame by replacing the source MAC address of the received data frame with information comprising: the switch ID, a VLAN ID associated with a port of the source switch device from which port the data frame is received, and the source IP address;

determine if there is a MAC address table in the source switch device;

if determine that there is the MAC address table in the source switch device, and if the MAC address table in the source switch device does not include an entry comprising the source IP address and the source MAC address, include in the entry of the MAC address table, the source IP address, the source MAC address, a port number indicating the port of the source switch device from which port the data frame is received, and the VLAN ID associated with the port of the source switch device from which port the data frame is received;

if determine that there is no MAC address table in the source switch device, generate a MAC address table and include in an entry of the generated MAC address table, the source IP address, the source MAC address, the port number indicating the port of the source switch device from which port the data frame is received, and the VLAN ID associated with the port of the source switch device from which port the data frame is received; and forward or flood the modified data frame to at least one switch device of the plurality of switch devices.

10. The source switch device according to claim 9, wherein at least 12 bits of a source MAC address field of the received data frame are configured for the VLAN ID.

11. The source switch device according to claim 9, wherein a switch ID is obtained for each of the plurality of switch devices.

12. The source switch device according to claim 9, wherein the data frame includes a sender MAC address, and the source switch device is operative to replace the sender MAC address of the received data frame with information comprising: the switch ID, the VLAN ID associated with the port of the source switch device from which port the data frame is received, and the source IP address.

13. The source switch device according to claim 9, if the received data frame is a unicast message or an Address Resolution Protocol (ARP) reply message, the source switch device is further operative to fetch a switch ID from a destination MAC address field of the received data frame, and determine an entry of a switch table of the source switch device, where the fetched switch ID from the destination MAC address field of the received data frame is associated with a port number in the entry of the switch table, and forward the received data frame through a port indicated by the port number to another switch device of the plurality of switch devices.

14. The source switch device according to claim 9, wherein each port of a switch device of the plurality of switch devices is provided with a port number, and said each port of the switch device of the plurality of switch devices is associated with a VLAN ID.

15. The source switch device according to claim 14, wherein the modified data frame is configured to pass through a port of the switch device of the plurality of switch devices if a VLAN ID associated with the port of the switch device is equal to 0, or if the modified data frame has a same VLAN ID as that associated with the port of the switch device.

16. A transit switch device for switching data frames in a communications network comprising a plurality of switch devices including the transit switch device, the transit switch device comprising a processor and a memory, the memory containing instructions executable by the processor, whereby the transit switch device is operative to:

receive a modified data frame from a source switch device, wherein the modified data frame is modified from a data frame including a source Media Access Control (MAC) address of a source host node, and a source Internet Protocol (IP) address of the source host node, by replacing the source MAC address of the data frame with information comprising: a switch ID of the source switch device, a VLAN ID associated with a port of the source switch device from which port the data frame is received, and a source IP address of the source host node;

fetch from a source MAC address field of the received modified data frame, the switch ID of the source switch device;

determine if there is a switch table in the transit switch device;

if determine that there is no switch table in the transit switch device, generate a switch table, and including in an entry of the generated switch table, the fetched switch ID and a port number indicating a port of the transit switch device from which port the modified data frame is received;

if determine that there is a switch table in the transit switch device, and if the switch table in the transit switch device does not include an entry comprising the fetched switch ID and the port number indicating the port of the transit switch device from which port the modified data frame is received, include in the entry of the switch table, the fetched switch ID and the port number indicating the port of the transit switch device from which port the modified data frame is received; and forward or flood the modified data frame to at least one switch device of the plurality of switch devices.

17. The transit switch device according to claim 16, if the modified data frame is a unicast message or an ARP reply message, the transit switch device is further operative to fetch a switch ID from a destination MAC address field of the modified data frame, and determine an entry of a switch table of the transit switch device, where the fetched switch ID from the destination MAC address field of the modified data frame is associated with a port number in the entry of the switch table, and forward the modified data frame through a port indicated by the port number to another switch device of the plurality of switch devices.

18. A destination switch device, for switching data frames in a communications network comprising a plurality of switch devices including the destination switch device, the destination switch device comprising a processor and a memory, the memory containing instructions executable by the processor whereby the destination switch device is operative to:

receive a modified data frame from a transit switch device, wherein the modified data frame is modified from a data frame including a source Media Access Control (MAC) address of a source host node, and a source Internet Protocol (IP) address of the source host node, by replacing the source MAC address of the data frame with information comprising: a switch ID of a source switch device, a VLAN ID associated with a port of the source switch device from which port the data frame is received, and a source IP address of the source host node;

fetch from a source MAC address field of the received modified data frame, the switch ID;

determine if there is a switch table in the destination switch device;

if determine that there is no switch table in the destinations witch device, generate a switch table, and including in an entry of the generated switch table, the fetched switch ID and a port number indicating a port of the destination switch device from which port the modified data frame is received;

if determine that there is a switch table in the destination switch device, and if the switch table in the destination switch device does not include an entry comprising the fetched switch ID and the port number indicating the port of the destination switch device from which port the modified data frame is received, include in the entry of the switch table, the fetched switch ID and the port number indicating the port of the destination switch device from which port the modified data frame is received; and forward or flood the received modified data frame to at least a destination host node that is connected to the destination switch device.

19. The destination switch device according to claim 18, if the modified data frame is a unicast message or an ARP reply message, the destination switch device is further operative to fetch a switch ID from a destination MAC address field of the modified data frame, and determine an entry of a switch table of the destination switch device, wherein the fetched switch ID from the destination MAC address field of the modified data frame is associated with a port number in the entry of the switch table, wherein the fetched switch ID from the destination MAC address field of the modified data frame is the same as a switch ID of the destination switch device, and the destination switch device is further operative to forward the modified data frame through a port indicated by the port number to the destination host node.

* * * * *